(12) United States Patent
Pryor et al.

(10) Patent No.: US 8,042,305 B2
(45) Date of Patent: Oct. 25, 2011

(54) DEPLOYABLE STRUCTURAL ASSEMBLIES, SYSTEMS FOR DEPLOYING SUCH STRUCTURAL ASSEMBLIES

(75) Inventors: Mark K. Pryor, San Diego, CA (US); Jeremy O. Newlin, San Diego, CA (US)

(73) Assignee: Alliant Techsystems Inc., Minneapolis, MN (US)

( * ) Notice: Subject to any disclaimer, the term of this patent is extended or adjusted under 35 U.S.C. 154(b) by 1381 days.

(21) Appl. No.: 11/080,357

(22) Filed: Mar. 15, 2005

(65) Prior Publication Data

US 2006/0207189 A1      Sep. 21, 2006

(51) Int. Cl.
*E02D 35/00*          (2006.01)

(52) U.S. Cl. ............. 52/121; 52/111; 52/108; 52/632; 52/634; 52/745.17; 244/159.4; 244/172.6

(58) Field of Classification Search .............. 52/111, 52/112, 113, 114, 115, 116, 117, 121, 120, 52/108, 632, 634; 244/159.4, 159.5, 172.6; 242/390.2
See application file for complete search history.

(56) References Cited

U.S. PATENT DOCUMENTS

| | | | |
|---|---|---|---|
| 889,395 A | 6/1908 | Noyes | |
| 908,999 A | 1/1909 | Johnson | |
| 1,531,982 A * | 3/1925 | Sago | 182/41 |
| 1,637,259 A | 7/1927 | Malone | |
| 2,130,993 A | 9/1938 | Dubilier | |
| 2,405,274 A | 8/1946 | Stites | |
| 2,643,745 A * | 6/1953 | Olszewski | 52/108 |
| 2,661,082 A * | 12/1953 | Ziegler | 52/108 |
| 2,709,975 A | 6/1955 | Brooks | |
| 2,727,220 A | 12/1955 | Buchanan et al. | |
| 2,796,299 A * | 6/1957 | Freeman | 52/111 |
| 2,799,368 A * | 7/1957 | Alter | 52/108 |
| 2,986,417 A | 5/1961 | Baker | |

(Continued)

FOREIGN PATENT DOCUMENTS

GB         2015616         9/1979

OTHER PUBLICATIONS

AEC-ABLE, "NASA SBIR Phase 2 Proposal for New Structures for Large Sensor Array Platforms: Hardware Development of Second-Order Augmentation of Lattice Trusses," Jul. 14, 2003.

(Continued)

*Primary Examiner* — Robert J Canfield
*Assistant Examiner* — Matthew J Gitlin
(74) *Attorney, Agent, or Firm* — TraskBritt

(57) ABSTRACT

A deployable structural assembly is provided along with associated deployment mechanisms and associated methods of forming and deploying the structural assembly. In one exemplary embodiment, the structural assembly includes a plurality of structural side elements formed from furlable truss structures. The truss structures may include spaced apart longitudinal members, members extending substantially transversely between the longitudinal members, and diagonal members extending between the longitudinal members at an acute angle relative thereto. A plurality of interlocking elements are located along the edges of the longitudinal members and are configured to engage interlocking elements of an adjacent structural side element. In one embodiment the truss structures may be formed to include at least one material layer having the longitudinal members, the cross-members and the diagonals formed as an integral structure. In another exemplary embodiment one or more of the structural side elements may include electronic components integrated therewith.

49 Claims, 21 Drawing Sheets

U.S. PATENT DOCUMENTS

| | | | |
|---|---|---|---|
| 3,012,635 A * | 12/1961 | Blain | 187/250 |
| 3,144,104 A | 8/1964 | Weir et al. | |
| 3,187,466 A | 6/1965 | Zerr | |
| 3,208,478 A | 9/1965 | Wadsworth | |
| 3,213,573 A * | 10/1965 | Bohr et al. | 52/108 |
| 3,221,464 A | 12/1965 | Miller | |
| 3,237,256 A | 3/1966 | Young | |
| 3,277,614 A | 10/1966 | Georges | |
| 3,319,987 A * | 5/1967 | Bohr et al. | 294/19.1 |
| 3,357,457 A | 12/1967 | Myer | |
| 3,360,894 A * | 1/1968 | Orr et al. | 52/108 |
| 3,361,377 A | 1/1968 | Trexler, Jr. | |
| 3,373,473 A * | 3/1968 | Keslin | 29/897.33 |
| 3,385,397 A * | 5/1968 | Robinsky | 182/41 |
| 3,434,254 A | 3/1969 | Rubin | |
| 3,434,674 A | 3/1969 | Groskopfs | |
| 3,473,758 A | 10/1969 | Valentijn | |
| 3,486,279 A | 12/1969 | Mauch | |
| 3,503,164 A * | 3/1970 | Einar et al. | 52/108 |
| 3,508,587 A | 4/1970 | Mauch | |
| 3,528,543 A | 9/1970 | Robinsky | |
| 3,532,742 A | 10/1970 | Weber | |
| 3,543,806 A | 12/1970 | Rushing et al. | |
| 3,546,049 A | 12/1970 | Kostick | |
| 3,564,789 A | 2/1971 | Vyvyan et al. | |
| 3,601,940 A | 8/1971 | Simon | |
| 3,608,844 A * | 9/1971 | Tumulty et al. | 242/899 |
| 3,645,146 A * | 2/1972 | Nagin | 74/89.21 |
| 3,665,670 A | 5/1972 | Rummler | |
| 3,749,133 A | 7/1973 | Bochory | |
| 3,805,462 A * | 4/1974 | Caperton | 52/108 |
| 3,811,633 A | 5/1974 | Cummings et al. | |
| 3,874,543 A | 4/1975 | Farnsworth | |
| 3,913,105 A | 10/1975 | Williamson et al. | |
| 3,937,426 A | 2/1976 | Pearce | |
| 4,018,397 A * | 4/1977 | Rusch et al. | 242/388.6 |
| 4,027,440 A | 6/1977 | Hamblin | |
| 4,045,931 A | 9/1977 | Becker | |
| 4,237,662 A * | 12/1980 | Kinzler | 52/108 |
| 4,332,501 A * | 6/1982 | Slysh | 403/219 |
| 4,334,391 A | 6/1982 | Hedgepeth et al. | |
| 4,337,560 A | 7/1982 | Slysh | |
| 4,386,485 A * | 6/1983 | Kramer | 52/108 |
| 4,475,323 A | 10/1984 | Schwartzberg et al. | |
| 4,480,415 A | 11/1984 | Truss | |
| 4,490,422 A * | 12/1984 | Pascher | 428/35.1 |
| 4,504,175 A * | 3/1985 | Zion | 405/259.5 |
| 4,524,552 A | 6/1985 | Hujsak | |
| 4,532,742 A | 8/1985 | Miura | |
| 4,539,786 A | 9/1985 | Nelson | |
| 4,557,083 A | 12/1985 | Zanardo | |
| 4,557,097 A | 12/1985 | Mikulas, Jr. et al. | |
| 4,569,176 A | 2/1986 | Hedgepeth et al. | |
| 4,574,535 A | 3/1986 | Pabsch | |
| 4,578,919 A | 4/1986 | Amadon et al. | |
| 4,587,777 A * | 5/1986 | Vasques et al. | 52/108 |
| 4,599,832 A | 7/1986 | Benton et al. | |
| 4,612,750 A | 9/1986 | Maistre | |
| 4,614,502 A | 9/1986 | Nelson | |
| 4,637,180 A * | 1/1987 | Zeigler | 52/109 |
| 4,651,480 A * | 3/1987 | Kramer | 52/108 |
| 4,655,022 A | 4/1987 | Natori | |
| 4,662,130 A * | 5/1987 | Miura et al. | 52/108 |
| 4,676,032 A | 6/1987 | Jutras | |
| 4,677,803 A | 7/1987 | Mikulas, Jr. et al. | |
| 4,686,134 A | 8/1987 | Ono | |
| 4,725,025 A | 2/1988 | Binge et al. | |
| 4,783,936 A | 11/1988 | Hujsak | |
| 4,866,893 A * | 9/1989 | McGinnis | 52/108 |
| 4,918,884 A | 4/1990 | Okazaki et al. | |
| 4,920,710 A | 5/1990 | Paine | |
| 4,958,474 A | 9/1990 | Adams | |
| 4,969,301 A | 11/1990 | Warden | |
| 5,016,418 A | 5/1991 | Rhodes et al. | |
| 5,056,278 A * | 10/1991 | Atsukawa | 52/108 |
| 5,094,046 A | 3/1992 | Preiswerk | |
| 5,154,027 A | 10/1992 | Warden | |
| 5,167,160 A | 12/1992 | Hall, II | |
| 5,168,679 A * | 12/1992 | Featherstone | 52/118 |
| 5,235,788 A | 8/1993 | Maimets | |
| 5,267,424 A | 12/1993 | Douglas | |
| 5,347,770 A * | 9/1994 | McDonnell et al. | 52/108 |
| 5,355,643 A * | 10/1994 | Bringolf | 52/108 |
| 5,570,546 A * | 11/1996 | Butterworth et al. | 52/111 |
| 5,803,418 A * | 9/1998 | Bringolf et al. | 248/158 |
| 5,857,648 A | 1/1999 | Dailey et al. | |
| 5,921,048 A | 7/1999 | Francom et al. | |
| 5,977,932 A | 11/1999 | Robinson | |
| 6,076,770 A | 6/2000 | Nygren et al. | |
| 6,112,474 A * | 9/2000 | Paine | 52/108 |
| 6,175,989 B1 | 1/2001 | Carpenter et al. | |
| 6,217,975 B1 * | 4/2001 | Daton-Lovett | 428/105 |
| 6,230,428 B1 | 5/2001 | Albin | |
| 6,256,938 B1 | 7/2001 | Daton-Lovett | |
| 6,321,503 B1 | 11/2001 | Warren | |
| 6,343,442 B1 | 2/2002 | Marks | |
| 6,345,482 B1 | 2/2002 | Warren | |
| 6,374,565 B1 | 4/2002 | Warren | |
| 6,453,973 B1 * | 9/2002 | Russo | 160/135 |
| 6,560,942 B2 | 5/2003 | Warren et al. | |
| 6,571,914 B2 | 6/2003 | Lee et al. | |
| 6,647,668 B1 | 11/2003 | Cohee et al. | |
| 6,701,679 B2 * | 3/2004 | Zazula et al. | 52/111 |
| 6,843,029 B2 | 1/2005 | Breitbach et al. | |
| 6,904,722 B2 * | 6/2005 | Brown et al. | 52/121 |
| 6,910,304 B2 | 6/2005 | Warren | |
| 6,920,722 B2 * | 7/2005 | Brown et al. | 52/108 |
| 6,931,812 B1 | 8/2005 | Lipscomb | |
| 7,028,442 B2 | 4/2006 | Merrifield | |
| 2002/0112417 A1 * | 8/2002 | Brown et al. | 52/108 |
| 2004/0194397 A1 * | 10/2004 | Brown et al. | 52/108 |
| 2004/0220004 A1 * | 11/2004 | Bourc'His | 474/152 |
| 2005/0126106 A1 | 6/2005 | Murphy et al. | |

OTHER PUBLICATIONS

AEC-ABLE, "New Structures for Large Sensor Array Platforms—Phase I Final Report," Jun. 14, 2003.

Crawford, R.F., "Strength and Efficiency of Deployable Booms for Space Applications," AAS/AIAA Variable Geometry and Expandable Structures Conf., Anaheim, California, AIAA Paper.

Murphey, Thomas W., "Performance Trends in Hierarchical Space Structures," posted to AEC-Able's Website, Apr. 2002.

PowerPoint Slides used in Dec. 12, 2002 Briefing by AEC-ABLE to the National Reconnaissance Organization.

U.S. Appl. No. 11/400,718, filed Apr. 7, 2006, entitled Deployable Structural Assemblies, Systems for Deploying Such Structural Assemblies and Related Methods.

JPS Glass, "Advanced Composites," http://www.jpsglass.com/advanced.htm., (no date).

J.D. Lincoln Inc., Product Data Sheet for L-695, Cyanate Ester Prepreg, http://www.jdlincoln.com., copyright 1999-2005.

* cited by examiner

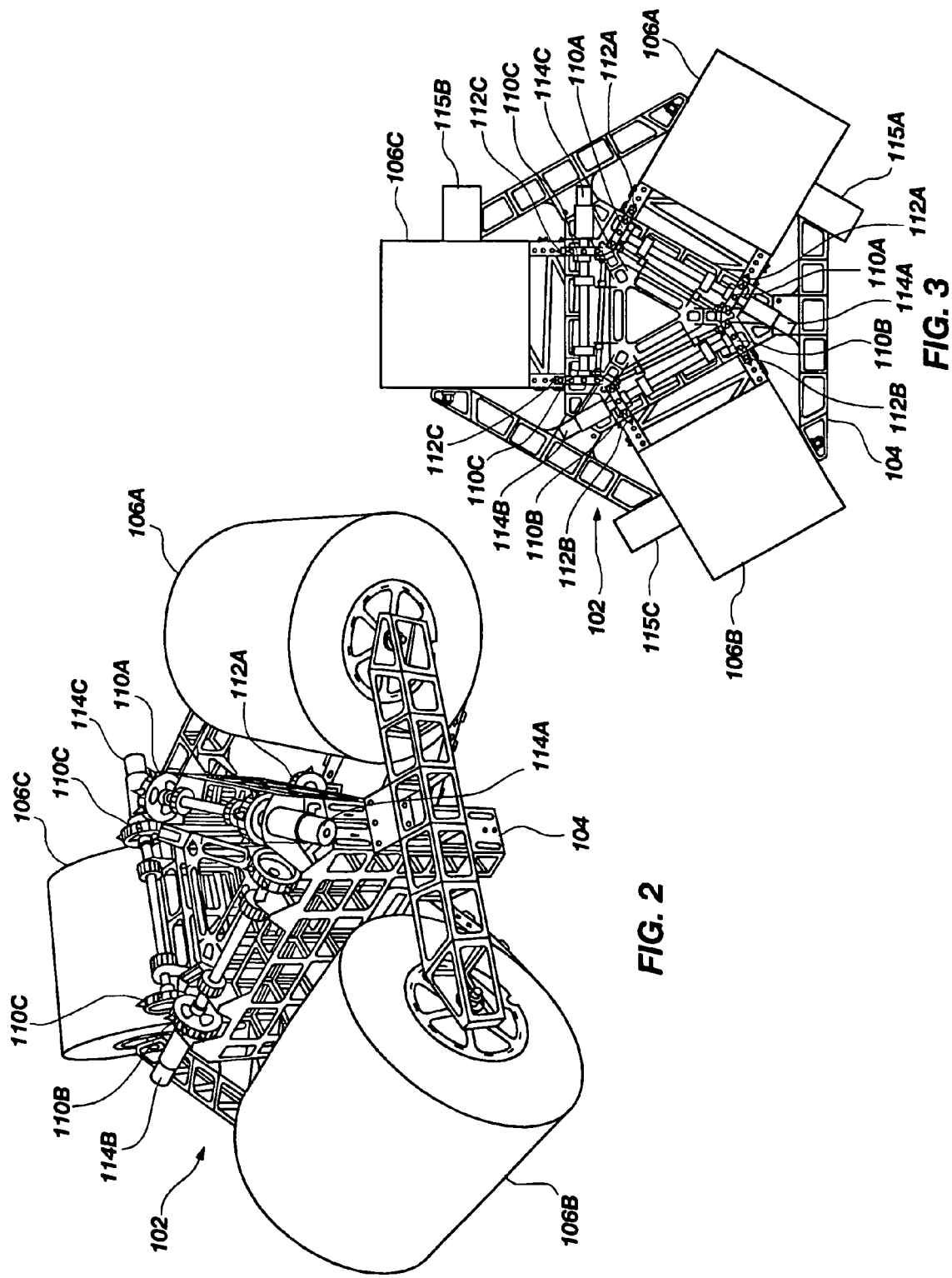

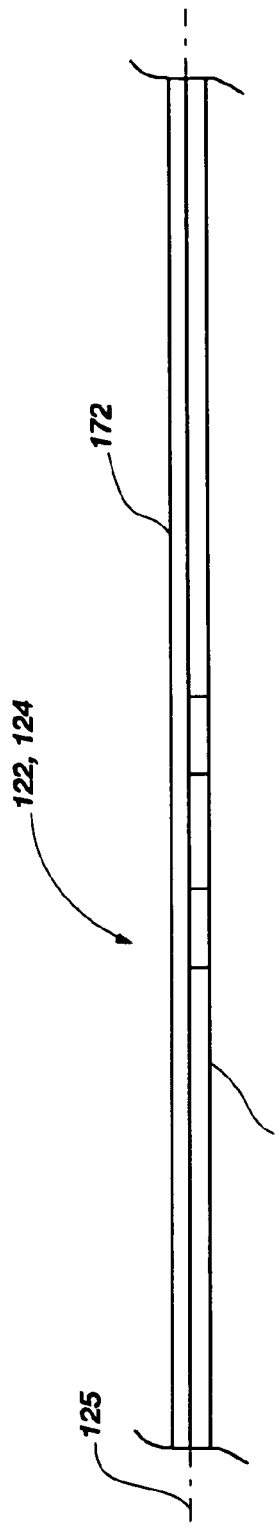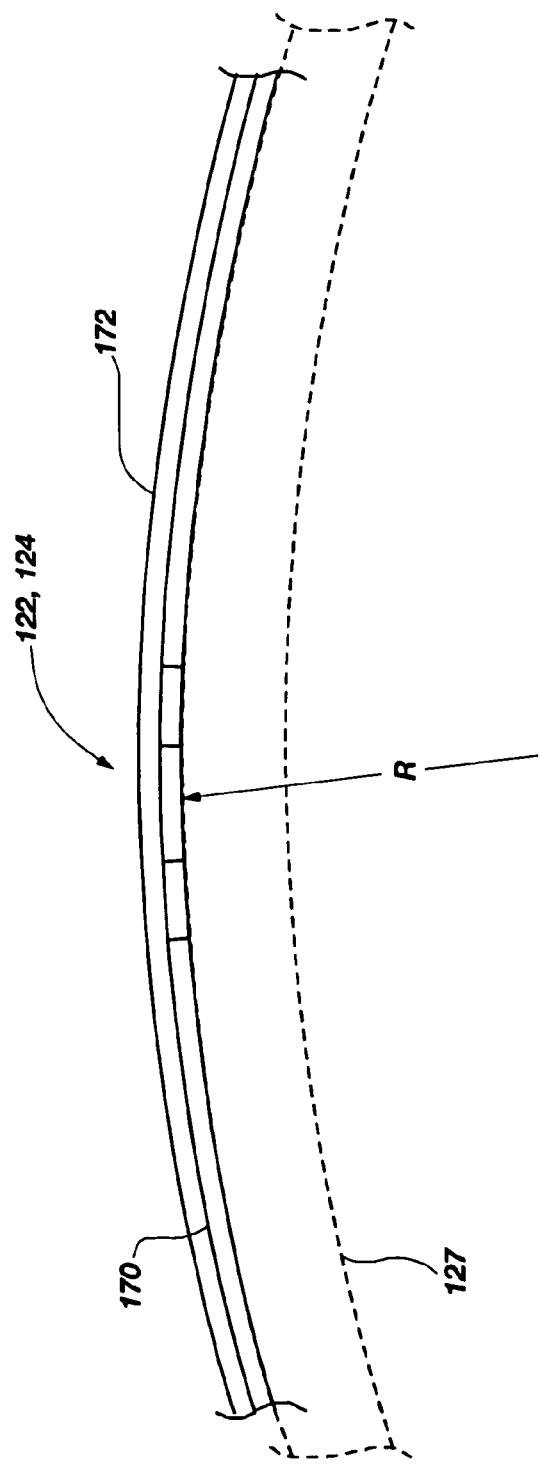

DEPLOYABLE STRUCTURAL ASSEMBLIES, SYSTEMS FOR DEPLOYING SUCH STRUCTURAL ASSEMBLIES

STATEMENT OF GOVERNMENT RIGHTS

The United States Government has certain rights in the present invention pursuant to Contract No. NAS1-02059 between the National Aeronautics and Space Administration (NASA) and ATK Composites.

CROSS-REFERENCE TO RELATED APPLICATIONS

The present application is related to U.S. patent application Ser. No. 11/400,718, filed Apr. 7, 2006, now U.S. Pat. No. 7,694,465, issued Apr. 13, 2010 and entitled Deployable Structure Assemblies, Systems for Deploying Such Structural Assemblies and Related Methods, which claims priority from U.S. patent application Ser. No. 60/669,449, to U.S. patent application Ser. No. 10/734,726, filed Dec. 12, 2003, now U.S. Pat. No. 7,694,486, issued Apr. 13, 2010 and entitled Deployable Truss Having Second Order Augmentation, and to U.S. patent application Ser. No. 12/683,344, filed Jan. 6, 2010 and entitled Deployable Truss Having Second Order Augmentation, pending, each of which is assigned to the Assignee of the present application.

BACKGROUND OF THE INVENTION

1. Field of the Invention

The present invention is generally related to deployable structural assemblies and, more particularly, to generally elongated, deployable structural assemblies having a high strength and stiffness to weight ratio that are highly compact for storage purposes, are efficiently deployed and retracted and are suitable for numerous uses.

2. State of the Art

It is often desirable to utilize a deployable structural assembly in various circumstances and environments. For example, deployable structural assemblies, sometimes referred to as deployable booms, may be utilized in conjunction with satellites or other aerospace vehicles. In many instances, the rigors of launching a satellite or aerospace vehicle make it impractical to have a structural assembly in an already deployed condition or as a permanent installation such that it is extending or protruding from the vehicle during launch. Thus, it is often desirable to delay the deployment of a structural assembly until it is needed for a specific purpose.

Even after an aerospace vehicle has been placed in a stable flight pattern or in orbit, it may not be desirable to continually maintain a structural assembly in a deployed state. Thus, it becomes desirable to utilize a structural assembly that is capable of being deployed and retracted, relative to the satellite or aerospace vehicle, when desired or on demand Such a structural assembly may be utilized to deploy, for example, solar sails or solar shields in association with a satellite after the satellite is placed in orbit. Deployable structural assemblies may also be used, for example, as an aid to an astronaut during maintenance activities when the astronaut is required to leave his or her aerospace vehicle to perform a specified activity, such as during the repair of a satellite or another aerospace vehicle.

Of course deployable structural assemblies have utilization in other circumstances as well including, generally, situations where it would be inefficient to build a permanent structural assembly but where a structural member or assembly is required to provide additional height or to span a distance in order to support or place a given component or structure at a specified location. In one example, a deployable structural assembly may be used to position a bank of lights above a specified area such as in an emergency situation or in association with an outdoor concert or other activity. Similarly, a deployable structural assembly might be used to position an antenna or other communications device. In another example, one or more deployable structural assemblies may be used to support a raised platform, which may serve as a working surface for one or more people.

Numerous configurations of deployable structural assemblies have been developed. For example, U.S. Pat. No. 2,130,993 issued to Dubilier; U.S. Pat. No. 2,799,368 issued to Alter; U.S. Pat. No. 3,213,573 issued to Bohr et al.; U.S. Pat. No. 3,503,164 issued to Berry et al.; U.S. Pat. No. 4,027,440 to Hamblin; and U.S. Pat. Nos. 4,386,485 and 4,651,480 issued to Kramer, each disclose deployable structural assemblies.

The Dubilier patent discloses a three-sided collapsible rod wherein the side components are made of sheets of flexible steel. The collapsible rod is stated to be used for deploying an antenna or as a rail component of a ladder.

The Alter patent discloses a four-sided collapsible structure that is formed of steel side sheets and which may also be used in conjunction with the temporary deployment of antennas.

The Bohr patent discloses a three-sided collapsible structure that may be used for supporting aerial masts or derrick booms. The structure is formed by engaging alternating teeth located at the edges of adjacent side elements in a zipper-like manner.

The Berry patent discloses a tubular structure having two interlocked sheets of material that are rolled flat during storage, but that expand due to stored energy when they are unrolled.

The Hamblin patent discloses an extensible structure used for tower cranes and scaffolding towers. The structure includes a plurality of modular truss-like structures that are hingedly coupled such that each module may be folded and stacked relative to one another.

The Kramer patents disclose extendible structures formed of flexible side sheets having locking members that each include a hemispherical projection at one longitudinal end thereof and a hemispherical recess at the opposing longitudinal end thereof. The locking members of adjacent side sheets are fastened together in an alternating zipper-like fashion such that the hemispherical projection of one locking member engages with the hemispherical recess of an adjacent alternating locking member. In one of the Kramer patents, the locking members are formed in the side sheet, while in the other patent, the locking members are formed as a part of a stiffening member.

While the above-listed U.S. patents show various configurations of deployable structural assemblies, it is desirable to improve upon the deployable structural assemblies disclosed in the prior art with regard to various features. For example, it is desirable to provide a deployable structural assembly having an improved interlocking arrangement that will enhance the integrity of the structure when deployed, while also providing efficient, simplified and reliable deployment and retraction. Additionally, it is desirable to provide a deployable structural assembly with an improved strength and stiffness to weight ratio while also being scalable in design such that various lengths, cross-sectional sizes and load capacities may be provided. It is also desirable to provide a deployable structural assembly that provides a significant reduction in stowed size and an improved packing factor as defined hereinbelow.

BRIEF SUMMARY OF THE INVENTION

The present invention provides a deployable structure and related methods having a plurality of flexible elements or components that, when joined together, form a structurally efficient member due, in part, to the interconnection of the flexible elements. The resulting structure or member is capable of bearing a substantially greater loading than are the individual flexible elements when they are not connected with one another.

In accordance with one aspect of the present invention, an apparatus, including deployable structural assembly, is provided. The apparatus includes at least three structural side elements, wherein each structural side element comprises a furlable truss structure. Each furlable truss structure comprises a first longitudinal member and a second longitudinal member spaced apart from the first longitudinal member. A plurality of cross-members each extend substantially transversely between the first longitudinal member and the second longitudinal member and are coupled therewith. A plurality of diagonal members also extend between the first longitudinal member and the second longitudinal member and are coupled therewith, wherein each diagonal member extends at an angle relative to an adjacent cross-member.

A first plurality of interlocking elements may be formed in the first longitudinal member and a second plurality of interlocking elements may be formed in the second longitudinal member. The first plurality of interlocking elements of one structural side element are configured for releasable engagement with the second plurality of interlocking elements of an adjacent structural side element. In one embodiment, the first plurality of interlocking elements may include a plurality of male interlocking elements and the second plurality of interlocking elements may include a plurality of female interlocking elements.

Each of the structural side elements may be furled onto an associated spool that is coupled with a frame. A deployment mechanism may be used to motivate each of the structural side elements between a furled state and at least a partially unfurled state.

In accordance with another aspect of the present invention, another apparatus, including a deployable structural assembly, is provided. The deployable structural assembly includes at least three structural side elements. Each of the structural side elements includes a first plurality of interlocking elements formed in a first longitudinal member and a second plurality of interlocking elements formed in a second longitudinal member. The first plurality of interlocking elements of one structural side element is configured for releasable engagement with the second plurality of interlocking elements of an adjacent structural side element. At least one electronic component is integrated with at least one of the at least three structural side elements. The electronic component may include, for example, a sensor or a conductor configured to transmit power or an electrical signal.

Each of the structural side elements may be furled onto an associated spool that is coupled with a frame. A deployment mechanism may be used to motivate each of the structural side elements between a furled state and at least a partially unfurled state.

In accordance with yet another aspect of the present invention, a method is provided for deploying a structural assembly having a plurality of furled structural side elements. The method includes engaging indexing structures of each of the plurality of furlable structural side elements with at least one drive element. Each structural side element is substantially motivated from a furled state to at least a partially unfurled state including inducing a twist across a face of each structural side element to displace a first edge of each structural side element towards a second edge of an adjacent structural side element. At least one interlocking element located along the first edge of each structural side element is engaged with at least one other interlocking element located along the second edge of each structural side element upon displacement of the first edge of each structural side element.

In accordance with yet a further aspect of the present invention, a method of forming a furlable structural element is provided. The method includes providing a layer of flexible material and forming a profile of a truss structure as a unitary continuous member from the layer of flexible material. Forming the unitary continuous member includes forming at least two spaced apart longitudinal members, a plurality of cross-members extending substantially transversely between the at least two longitudinal members, and a plurality of diagonals extending between the at least two longitudinal members at an acute angle relative thereto. In another embodiment of the invention, the truss structure may be formed as a unitary member through a molding process, such as by injection molding. In a molding process, structural reinforcing members, such as metal plates or bars, may be integrally molded into the truss structure. Also, the material placed in the mold to form the truss structure may include reinforcing fibers to strengthen the molded components of the resulting truss structure.

In accordance with another aspect of the present invention, another method is provided of forming a furlable structural element. The method includes providing a first layer of flexible material having a first coefficient of thermal expansion (CTE) and providing a second layer of flexible material having a second CTE different from the first CTE. The second layer of flexible material is disposed on the first layer of flexible material to extend in a first longitudinal direction.

At least one of the first layer of flexible material and the second layer of flexible material is subjected to a temperature elevated above ambient temperature and the first and second layers of flexible material are bonded together to form a bonded structure. A desired radius of curvature is induced in the bonded structure about an axis substantially transverse to the first longitudinal direction due to the difference in the first CTE and the second CTE.

In another embodiment of the invention, a furlable structural element may be formed, regardless of materials of construction, to exhibit a desired radius of curvature about an axis substantially transverse to a longitudinal axis thereof while the structural element is in a relaxed state. The radius of curvature of the structural element is greater than the radius of curvature of the furlable element when in an intended stored or stowed state. In one particular exemplary embodiment, the radius of curvature of the structure element while in a relaxed state is approximately twice the radius of curvature thereof while in a stored state.

In accordance with yet a further aspect of the invention, an apparatus is provided including a deployable structural assembly. The apparatus includes at least three structural side elements, each of the at least three structural side elements being configured for releasable engagement with an adjacent structural side element. Additionally, the apparatus includes at least three structural reinforcing members, wherein each of the structural reinforcing members is releasably coupled to one of the at least three structural side elements and an adjacent one of the at least three structural side elements.

In accordance with yet another aspect of the present invention, another apparatus, including a deployable structural assembly, is provided. The apparatus includes at least three furlable structural side elements and a deployment mechanism. Each furlable structural side element includes a first plurality of interlocking elements formed adjacent a first edge of the furlable structural side element and a second plurality of interlocking elements formed adjacent a second edge of the furlable structural side element, wherein the first plurality of interlocking elements of one structural side element are configured for releasable engagement with the second plurality of interlocking elements of an adjacent structural side element. The deployment mechanism is configured to deploy each of the at least three furlable structural side elements such that at least a first portion of each of the at least a three structural side elements are in a stowed state, while at least a second portion of each of the at least three structural side elements are in a deployed stated and coupled with an adjacent one of the at least three furlable structural side elements to form the structural assembly. The structural assembly and the deployment mechanism are cooperatively configured to bear a loading while the at least a first portion of each of the at least three furlable structural side elements is in a stowed state.

The present invention, including its various embodiments, aspects and features, provides numerous advantages as compared to prior art structures and assemblies. For example, the present invention provides a structure having a high strength and stiffness-to-weight ratio, and demonstrates improved efficiency in terms of being stored in relatively small volumes, including a relatively small stowed height, as compared to its deployed volumes. The deployment mechanism of the present invention also provides for a small transition distance between the stowed state of a structural side element and a deployed state thereof.

The present invention also provides a structure having full structural capabilities during the deployment thereof, such that complete deployment is not required for use of the structure. Furthermore, the present invention is readily scalable to any length or cross-sectional size. The truss design and the configuration of the structural side elements of the present invention provides an open center geometry enhancing the flexibility of the structure in terms of different uses and applications for which the structure is suitable. The flat design of the structural side elements further enables the integration of electronic components therewith. Such a design further simplifies manufacturing of the structural side elements and provides considerable flexibility in the manufacturing and design process of such structural side elements.

The structure of the present invention also enables controllable deployment thereof including auto-retraction and repeatable deployment. Additionally, the structure of the present invention exhibits low thermal distortion properties, good damping characteristics and a low amount of stored energy when in a stowed state.

BRIEF DESCRIPTION OF THE SEVERAL VIEWS OF THE DRAWINGS

The foregoing and other advantages of the invention will become apparent upon reading the following detailed description and upon reference to the drawings in which:

FIG. 2 shows a perspective view of the mechanism shown in FIG. 1;

FIG. 3 shows a plan view of the mechanism shown in FIG. 1;

FIGS. 6A and 6B are side views of a structural side element in accordance with an embodiment of the present invention;

DETAILED DESCRIPTION OF THE INVENTION

Figure 1:
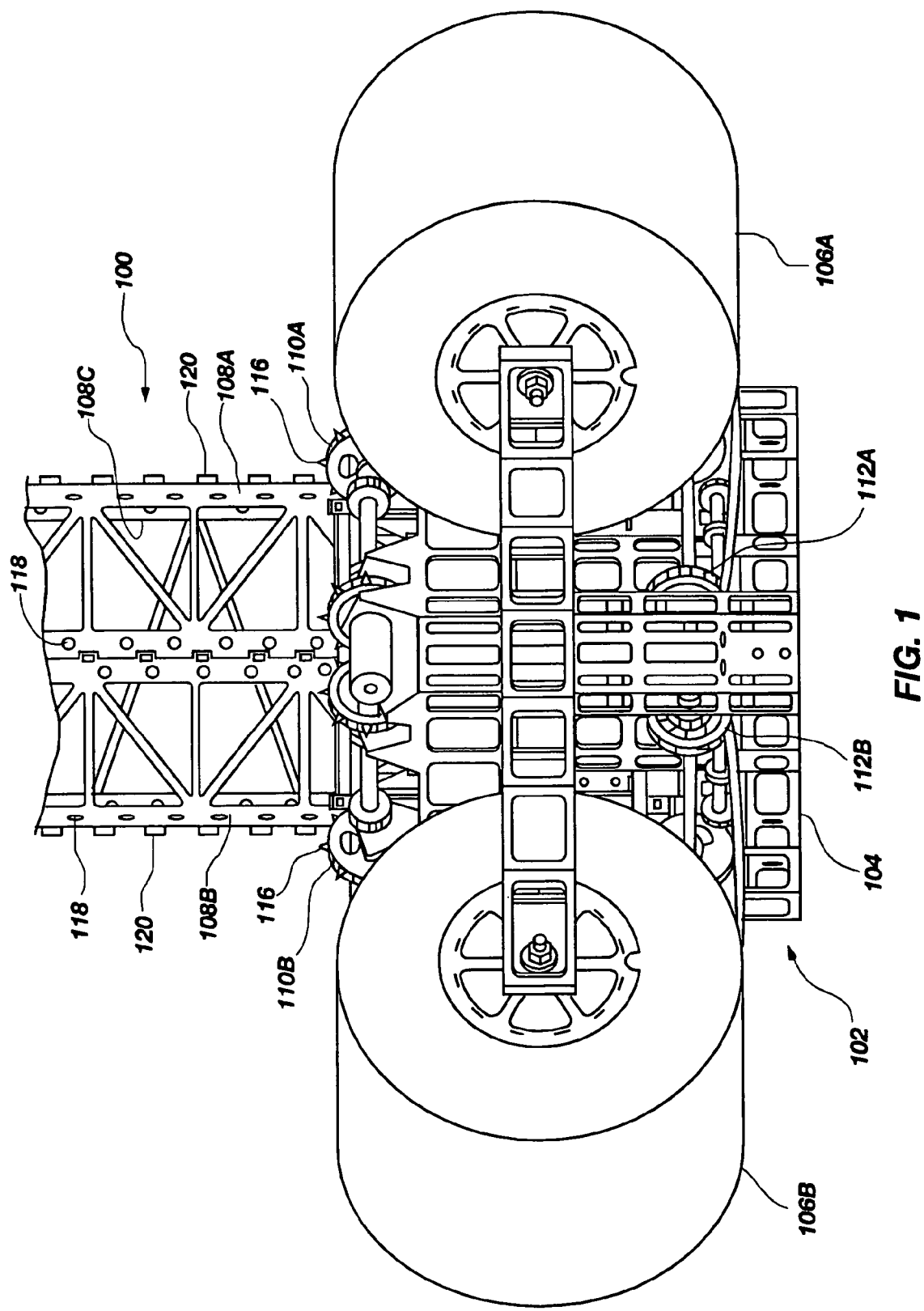
FIG. 1 is an elevational view of a deployable structural assembly with an associated deployment mechanism in accordance with an embodiment of the present invention.

Referring to FIGS. 1 through 3, a deployable structural assembly, referred to herein as a boom 100 for purposes of brevity and convenience, is deployed from an associated deployment mechanism 102. It is noted that the boom 100 is not shown in FIGS. 2 and 3 for purposes of clarity. Generally, the deployment mechanism 102 includes a frame 104 to which are coupled a plurality of stored structural elements, shown in FIG. 1 as rolled members 106A-106C. The structural elements that are stored as rolled members 106A-106C, when deployed and appropriately interlocked with one another, each act as a structural side element 108A-108C of the boom 102.

One or more drive rollers 110A-110C and one or more guide rollers 112A-112C may be associated with each rolled member 106A-106C (e.g., drive rollers 110A and guide rollers 112A associated with rolled member 106A) to help dispense the structural side elements 108A-108C from their associated rolled members 106A-106C.

A drive mechanism 114A-114C may be coupled to the drive rollers 110A-110C and configured to motivate the drive rollers 110A-110C in dispensing the structural side elements 108A-108C from the rolled members 106A-106B. For example, the drive mechanism 114A-114C may include a stored energy device such as a coiled spring having a clutch or a braking device to control the release of the stored energy. In other embodiments, a DC stepper motor with a gear head, an AC or a DC servo motor or other drive mechanism may be used to control the positioning of the drive rollers 110A-110C. Use of a DC motor or a similar device provides the advantage of being able to control the rotational positioning of the drive rollers 110A-110C including the direction and speed of rotation the drive rollers 110A-110C. Thus, use of a DC motor or similar device allows the drive rollers 110A-110C to be reversed in direction such that the structural side elements 108A-108C may be retracted and furled back onto the rolled members 106A-106B.

In another embodiment, in conjunction with the use of DC motor or similar device, an energy storage device 115A-115C (FIG. 3) may be coupled to the rolled members 106A-106C so that, as the structural side elements 108A-108C are deployed, energy is built up and stored within the energy storage device 115A-115C. When the direction of drive rollers 110A-110C are reversed to retract the structural side elements 108A-108C, the storage devices may then aid the furling of the structural side elements 108A-108C by motivation the rolled members in the appropriate direction.

Each of the drive rollers 110A-110C may include pins 116 or other structural elements positioned and configured to engage indexing structures 118 formed in each of the structural side elements 108A-108C. Thus, during deployment of the boom 100, the drive mechanisms 114A-114C each rotate their associated drive rollers 110A-110C and the pins 116 of the drive rollers 110A-110C engage the indexing structures 118 of the structural side elements 108A-108C so as to pull the structural side elements 108A-108C off of the rolled members 106A-106C, over the guide rollers 112A-112C and through a central portion of the frame 104 for joining with one another and deployment as an elongated structural assembly or boom 100.

Figure 4:
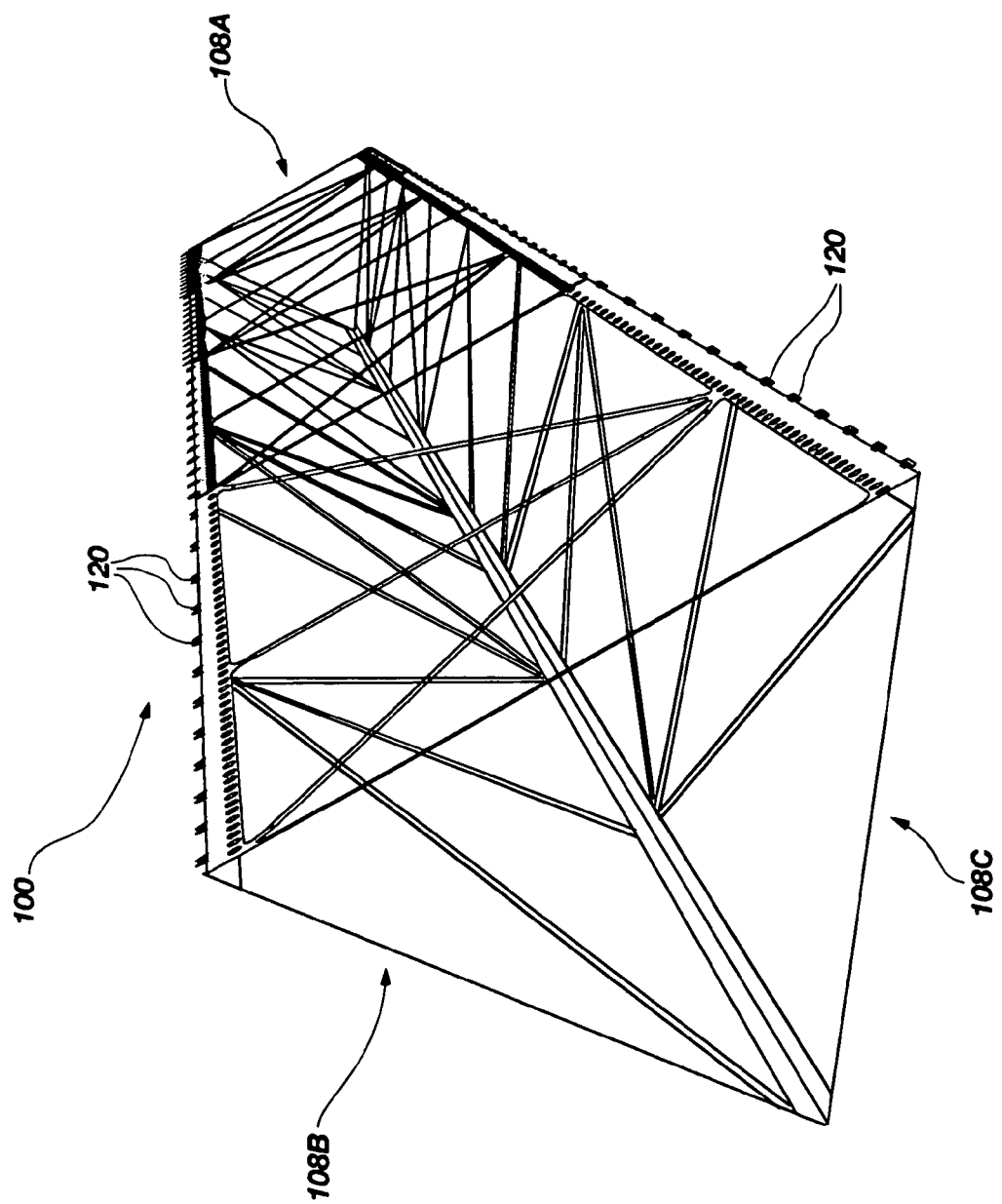
FIG. 4 is a perspective view of a portion of a structural assembly while in a deployed state in accordance with an embodiment of the present invention.

Referring to FIG. 4, a perspective view is shown of a portion of a boom 100 in accordance with one embodiment of the invention. The exemplary boom 100 is formed of a plurality of structural side elements 108A-108C that are joined together by a plurality of interlocking elements 120 formed along the edges of the structural side elements 108A-108C. As is seen in FIG. 4, the boom 100 is formed as a substantially open structure having an open interior and structural side elements 108A-108C that are formed generally as frames or trusses.

Figure 5:
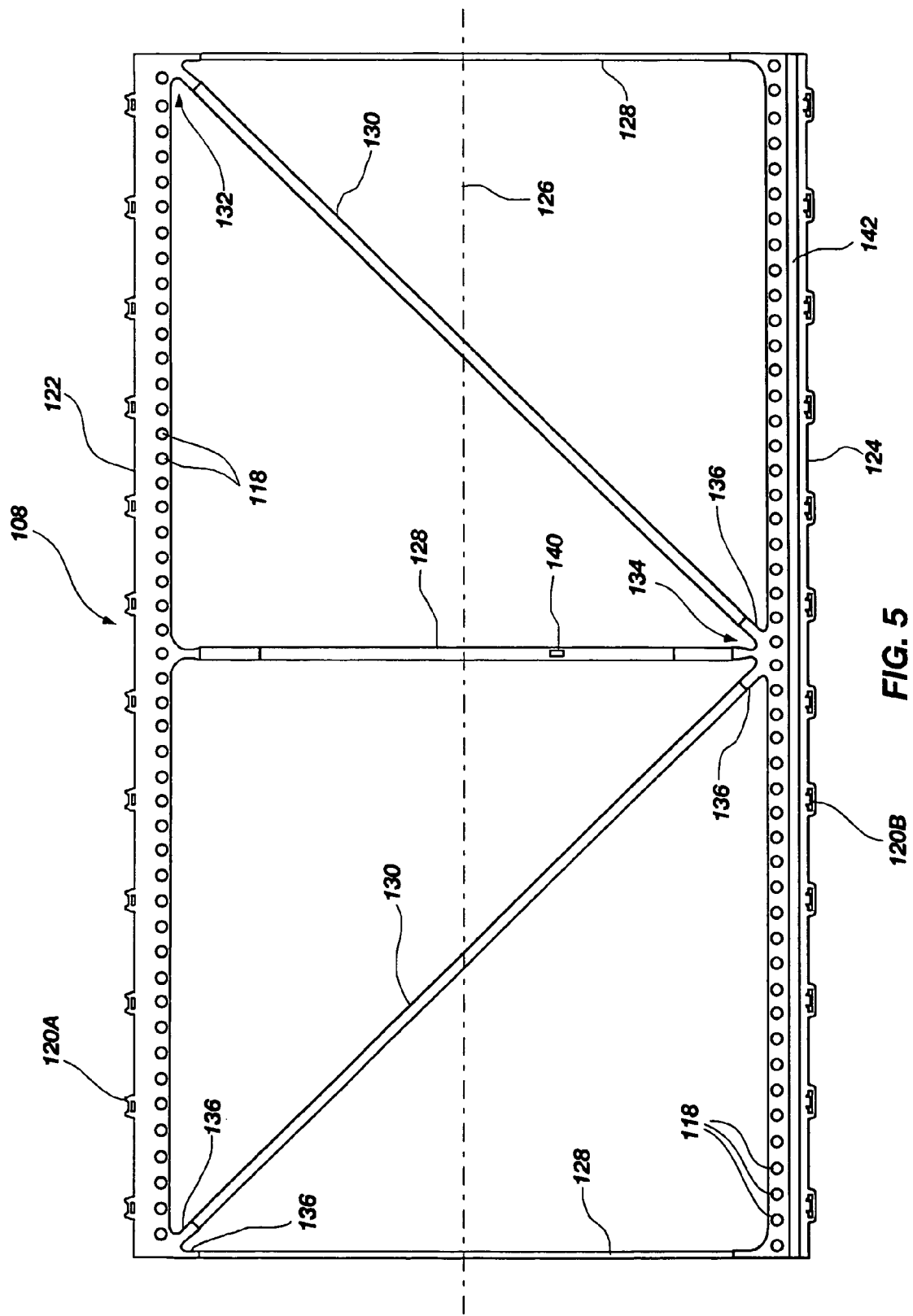
FIG. 5 is a plan view of a structural side element of the assembly in FIG. 4 in accordance with an embodiment of the present invention.
Figure 8A:
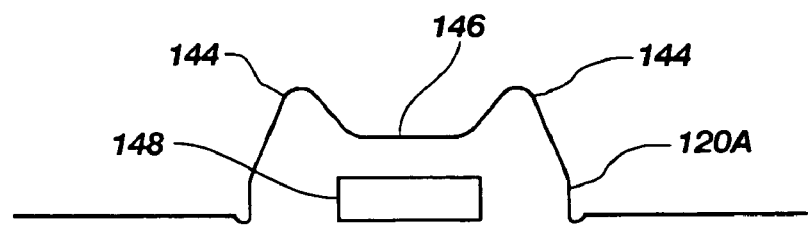
FIGS. 8A-8C are plan views of interconnecting structures of the side structure shown in FIG. 5 in accordance with an embodiment of the present invention.
Figure 8B:
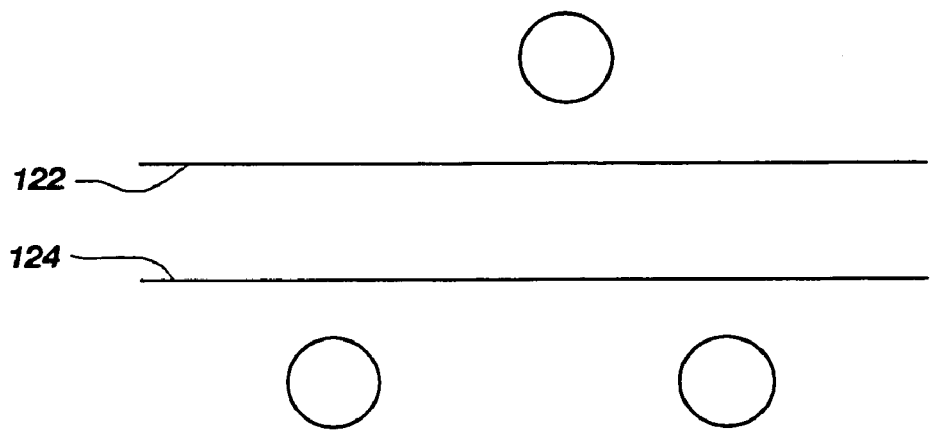
Figure 8C:
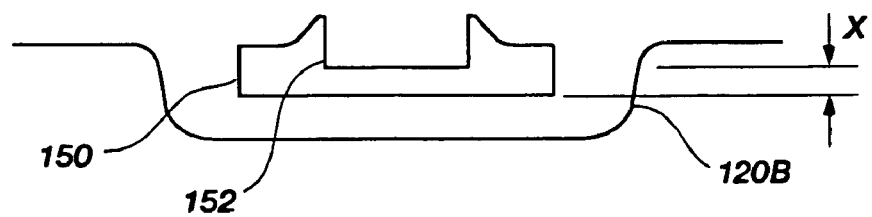

Referring to FIG. 5, a structural side element 108 is shown that may be used to form a boom 100. The exemplary structural side element 108 includes a first longitudinal member 122, which may also referred to as a longeron, a second longitudinal member 124 (or longeron) spaced apart from, and extending substantially parallel to, the first longitudinal member 122 (FIG. 8C). As noted above, each of the longitudinal members 122 and 124 may include indexing structures 118 such as apertures, cutouts, recesses or other features sized and configured for cooperative engagement with the pins 116 of the drive rollers 110A-110C, guide rollers 112A-112C or both. The longitudinal members 122 and 124 are desirably formed as structures exhibiting a high axial stiffness while also exhibiting low bending stiffness, such that they are furlable about an axis that is substantially perpendicular to a longitudinal axis 126 of the structural side element 108. In other words, the longitudinal members 122 and 124 must be able to withstand substantial axial loading while in the deployed condition, while also being capable of being repeatedly furled or rolled into a rolled member (e.g., 106A, FIG. 1) for storing. In one embodiment, the longitudinal members 122 and 124 may be formed as a multicomponent member including a first highly flexible composite laminate structure bonded to a second composite material that is highly directional exhibiting a high degree of axial stiffness in a direction parallel to the longitudinal axis 126 of the structural side element 108. In another embodiment, the highly directional material may be sandwiched between two layers of material exhibiting increased flexibility as compared to the highly directional material. In more general terms, construction of the longitudinal members 122 and 124 in accordance with such embodiments may include multiple layers of material wherein the layer of material exhibiting the highest axial stiffness is placed in the center of the thickness of the longitudinal members or, more accurately, along or near the neutral axis of the longitudinal members 122 and 124 as will be appreciated by those of ordinary skill in the art.

In one particular embodiment, the longitudinal members 122 and 124 may be formed of a first layer of fiber reinforced composite material such as, for example, a quartz, glass or silica fiber material (such as that which is marketed under the ASTROQUARTZ® trademark) with a cyanate-esther resin. Of course other materials may be utilized. For example, para-aramid fibers, available under the trademark KEVLAR®, may be used and other resins may be employed. Additionally, in some embodiments, composite materials need not be used. For example, the first layer used to form the longitudinal members 122 and 124 may include a layer of titanium or other metal or metal alloy.

It is noted that the use of a quartz or silica fiber or fabric enables the use of a laser for cutting the composite material and provides low moisture absorbing characteristics (although other materials such as titanium may provide similar characteristics) while the use of a cyanate-esther resin provides advantageous outgassing characteristics that are desirable in the transport of such materials into space. This material could be cut by a laser-cutting machine, which enables the efficient and precise fabrication of complex geometries. A second layer of material, for example, a carbon reinforced fiber material, which may also include a cyanate-esther resin, may then be bonded to the first layer of material. The second layer of material, which may exhibit a less complicated geometry (for example, a lack of interlocking elements 120A, 102B, indexing structures 118, or both), may be formed using a less expensive cutting or shaping process such as by stamping or use of a water jet cutting machine. Of course other methods of forming or shaping the first and second layers of material may be utilized as will be appreciated by those of ordinary skill in the art.

Referring briefly to FIGS. 6A and 6B, a radius of curvature R may be induced into the longitudinal members 122 and 124 during the fabrication thereof. Desirably, the radius of curvature so induced is greater than the radius of curvature of such members when they are in a stowed state, such as in rolled members 106A-106C. Thus the radius of curvature R (FIG. 6B) exhibited by the longitudinal members 122 and 124 while in a "relaxed" state (i.e., when not subjected to any external forces) is actually a midstate between being deployed (e.g., see structural side elements 108A-108C in FIG. 1) and being stowed as a rolled member 106A-106C. This curved midstate results in a lower energy state of the rolled members 106A-106C as compared to using longitudinal members 122 and 124, which exhibit substantially no radius of curvature while in a relaxed state. Similarly, if the natural or relaxed state of the longitudinal members was to approximate a radius of curvature substantially similar to that exhibited thereby while stowed as a rolled member 106A-106C, additional energy would be required to deploy the structural side elements 108A-108C and form the boom 100.

In one exemplary embodiment, the radius of curvature R of the longitudinal members 122 and 124 while in a relaxed state may be approximately twice the radius of curvature of the longitudinal members 122 and 124 while in a stowed state. Such a configuration allows the stress state of the longitudinal members 122 and 124 while in a deployed state to be substantially equal, but opposite to the stress state of the longitudinal members 122 and 124 while they are in the stored state. Additionally, such a configuration prevents any undesired yielding of the longitudinal members 122 and 124 due to the repeated transitioning from a stored state to a deployed state and vice versa, thereby maximizing the available bending stiffness of the longitudinal members 122 and 124.

The radius of curvature R may be induced into the longitudinal members 122 and 124 in various ways. For example, in constructing a longitudinal member 122 from the above described composite materials, it may be desirable to form a first flexible sheet of material 170 from a material exhibiting a first coefficient of thermal expansion (CTE) and a second flexible sheet of material 172 from a material exhibiting a second, substantially different CTE. Thus, for example, a first flexible sheet of material 170, which may include a fiber (e.g., glass, quartz or silica) reinforced composite material, and a second flexible sheet of material 172 including a carbon fiber reinforced material may be combined (FIG. 6A) such that, upon curing of the longitudinal member 122 (or other bonding of the two layers 170 and 172) at an elevated temperature (e.g., above ambient), the mismatch in CTEs of the two (or more) materials causes the resulting structure to curl (FIG. 6B) and exhibit a desired radius of curvature R about an axis that is substantially perpendicular to the longitudinal axis 125 of the longitudinal member 122. Thus, materials used in fabricating the longitudinal member 122 may be selected to specifically obtain a desired mismatch of CTEs and thereby produce the desired radius of curvature R. Additionally, or alternatively, it may be desirable to cure the longitudinal member 122 over a curved mandrel 127 (shown in FIG. 6B in dashed lines) to enhance such curling, or to provide an added measure of control in forming the radius of curvature R of the resultant longitudinal member 122.

In another embodiment, the longitudinal members 122 and 124 may be formed of a material including, for example, a metal or metal alloy that may be preyeilded to the desired radius of curvature R. In one exemplary embodiment, a layer of titanium may be passed over a roller to yield the material and provide the radius of curvature R while the titanium is in a relaxed state. The longitudinal members 122 and 124 formed of such curved titanium will then resist additional yielding as it is deployed between the stored and deployed states as described hereinabove.

Referring back to FIG. 5, the longitudinal members 122 and 124 are coupled to one another by a plurality of structural members. For example, a plurality of rigid cross-members or battens 128 may extend between the longitudinal members 122 and 124 at a substantially perpendicular orientation relative thereto. In one exemplary embodiment, the battens 128 may be formed as a strip of rigid material (or a plurality of strips arranged in a laminar manner) of carbon fiber reinforce material, titanium, aluminum, copper beryllium or some other high strength material. The battens 128 may be configured to accommodate both tensile and compressive loading. It is noted that, because the battens 128 are oriented substantially perpendicular to the longitudinal axis 126, the battens 128 are not effectually rolled and do need to be formed of a furlable material.

Flexible diagonal members 130 extend between the longitudinal members 122 and 124 at an acute angle relative thereto. The diagonal members may also extend between adjacent battens 128. Thus, for example, a diagonal 130 may extend from a location 132 where a batten 128 and the first longitudinal member 122 are coupled to a location 134 where an adjacent batten 128 and the second longitudinal member 124 are coupled. In one embodiment, the diagonals 130 are designed to act in tension and, thus, may be formed as relatively thin furlable structures from a highly flexible material.

Figure 7:
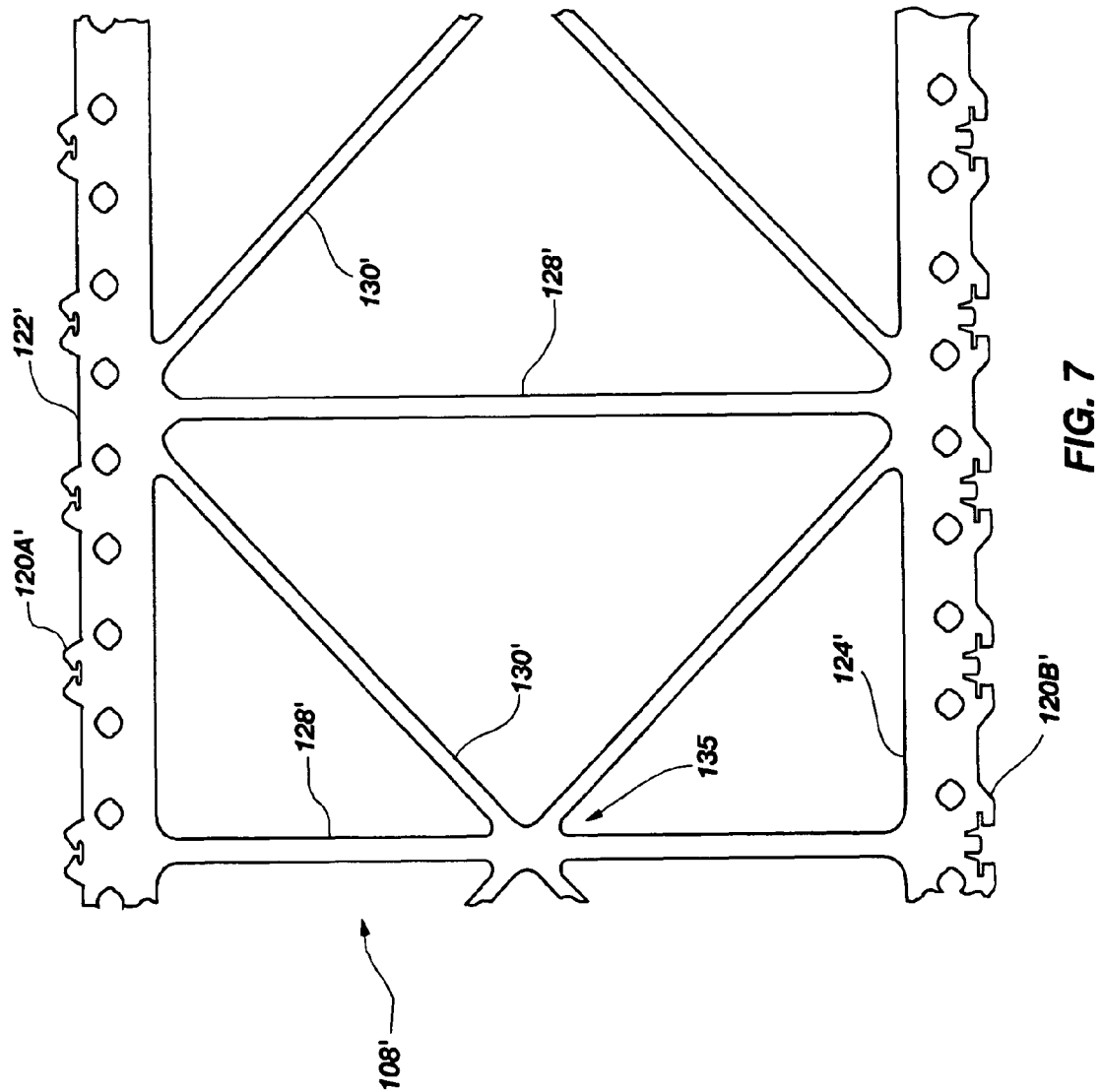
FIG. 7 is a plan view of a structural side element in accordance with another embodiment of the present invention.

The structural side element 108 may thus be formed as a frame or a truss configured to distribute applied loads throughout its plurality of joined members (e.g., longitudinal members 122 and 124, battens 128 and diagonals 130). Referring briefly to FIG. 7, other frame or truss configurations may be utilized in forming a structural side element 108'. The structural side element 108' generally includes structural members such as longitudinal members 122' and 124', battens 128' and diagonals 130'. However, these components exhibit a different truss arrangement than that shown and described with respect to FIG. 5. For example, at various locations, some of the diagonals 130' may intersect with one another, as well as with a batten 128', to form a union 135 at a location between the longitudinal members 122' and 124'. The truss configurations shown and described with respect to FIGS. 5 and 7 are exemplary. Other frame or truss configurations may be utilized depending, for example, on the expected loading of the structural side element 108, 108' when deployed as an interlocked component of the boom 100 (FIGS. 1 and 4) as will be appreciated by those of ordinary skill in the art.

Referring again back to FIG. 5, in addition to the structural components used to form the structural side element 108, electronic components may be integrated therewith. For example, a sensor 140 may be embedded in, or otherwise coupled with, a longitudinal member 122 and 124, a batten 128 or a diagonal 130. Such a sensor 140 might include a temperature sensor, a force or load sensor, a proximity sensor, a strain gauge, or some other sensor configured to determine a parameter associated with the deployment and use of the boom 100. Additionally, a conductor 142 may be formed in, or attached to, a longitudinal member 122 and 124 or one of the other components. The conductor 142 may be configured to transmit electrical power to a portion of the boom 100 such as a working platform (not shown) coupled with the boom 100. In another embodiment, the conductor 142 may be configured as a bus to carry electrical signals to components associated with the boom 100 such as, for example, a sensor 140 or some other component. In yet another embodiment, the conductor 142 may include an optic fiber configured to transmit a signal therethrough in a manner similar to an electrical bus. The conductor 142, if extending longitudinally with a structural side element 108A-108C, is configured to be furlable therewith. In one embodiment, as described in more detail hereinbelow, the conductors 142 and the sensors 140 may be used to verify positive engagement of corresponding interlocking elements 120A and 120B.

Referring back to FIG. 5, the longitudinal members 122 and 124 may include integrally formed tabs 136, which may be bonded to the battens 128 and the diagonals 130. Such bonding may include for example, adhesive bonding, thermal bonding or co-curing. However other techniques of fastening or joining the various components may be used depending, for example, on the materials being utilized to form such components.

In another embodiment, such as that shown and described with respect to FIG. 7, the structural side element 108' may be formed by cutting or stamping the profile of the structural side element 108' (including the longitudinal members 122' and 124', battens 128' and diagonals 130') from a single sheet of material (e.g., a sheet or a plurality of laminated sheets of fiber reinforced composite material). For example, a profile may be excised from a sheet of material by way of stamping, water jet cutting, laser cutting or some other suitable technique. Thus, in at least one layer of material, the longitudinal members 122' and 124', the battens 128' and the diagonals 130' (as well as other features or members that may be desired) may be formed as an integral, continuous material structure.

Additional reinforcing structures may then be bonded or joined to the integral material layer as appropriate. For example, a titanium-reinforcing member may be bonded or joined to the layer to strengthen the resulting batten 128'. Similarly, additional reinforcing materials may be bonded or joined to longitudinal members 122' and 124' to provide additional axial stiffness. Such a method of forming the structural side element 108' (e.g., using laser cutting, water jet cutting, stamping or similar processes to define a first component having specified desirable material characteristic and then bonding a second material thereto having other specified desirable characteristics) provides a high-precision, low cost process for manufacturing the side elements 108A-108C regardless of the specific structural or geometric configuration thereof.

Referring again to FIG. 5, it is noted that the first longitudinal member 122 includes a plurality of male interlocking elements 120A that may be integrally formed therewith. Similarly, the second longitudinal member 124 includes a plurality of female interlocking elements 120B that may be integrally formed therewith. Referring to FIGS. 8A and 8C, FIG. 8A shows an enlarged view of a male interlocking element 120A while FIG. 8C shows an enlarged view of a female interlocking element 120B. The male interlocking element 120A includes two fingers 144, one along each side of thereof, that are shaped so that they each exhibit a narrowing profile as they extend outwardly from the longitudinal member 122. A recess 146 is defined between the two fingers 144. The male interlocking element 120A also includes an opening or an aperture 148 formed therein.

The female interlocking element 120B includes an opening 150 sized, shaped and configured for receipt of the male interlocking element 120A. Additionally, a tongue 152 is formed within the opening 150 of the female interlocking element 120B. The tongue 152 is configured to engage the aperture 148 of the male interlocking element 120A upon insertion of the male interlocking element 120A into the opening 150 of the female interlocking element 120B. It is noted that the distance X between the end of the tongue 152 and the opposing surface of the opening 150 may be a dimension that is less than the thickness of the male interlocking element 120A immediately surrounding the aperture 148 so as to increase the distance that tongue 152 protrudes through the opening 150 in an interlocking manner. However, the distance X does not need to be less than the thickness of the male interlocking element 120A to ensure such protrusion due to the angular orientation of adjacent structural side elements 108A-108C (which is approximately 60°). It may be desirable to define the interference of the tongue 152 with the aperture so as to ensure efficient engagement of the interlocking elements 120A and 120B during deployment of the boom 100 while also ensuring that the interlocking elements remain secured to one another after deployment. For example, in one embodiment, it may be desirable to have the tongue 152 extend through the aperture 148 and extend therefrom a distance of at least 25% of the thickness of the male interlocking element 120A immediately surrounding the aperture 148. In another embodiment, it may be desirable to having the have the tongue 152 extend through the aperture 148 and extend therefrom a distance of approximately 125% to 200% of the thickness of the male interlocking element 120A immediately surrounding the aperture 148. Of course, such a design parameter may depend on various factors such as, for example, the type of material that is used to form the interlocking elements 120A and 120B, the actual size of the interlocking elements 120A and 120B, and manufacturing tolerances.

Figure 9A:
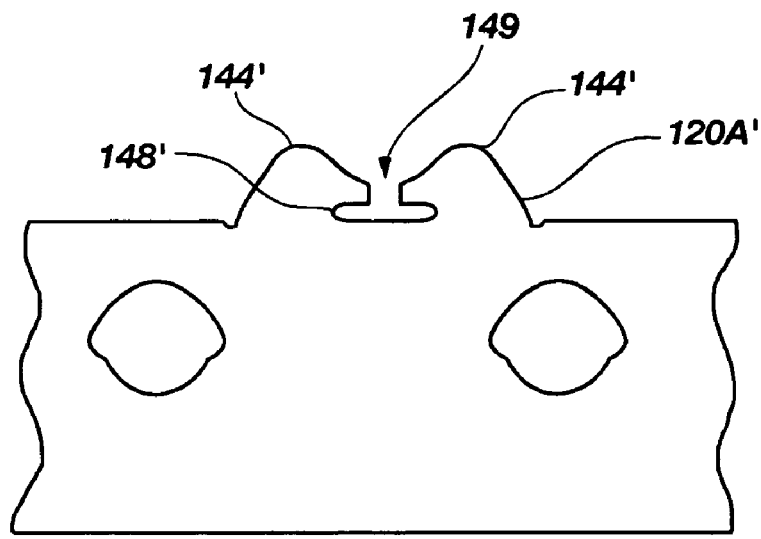
FIGS. 9A and 9B are plan views of interconnecting structures of the side structure shown in FIG. 7 in accordance with an embodiment of the present invention.
Figure 9B:
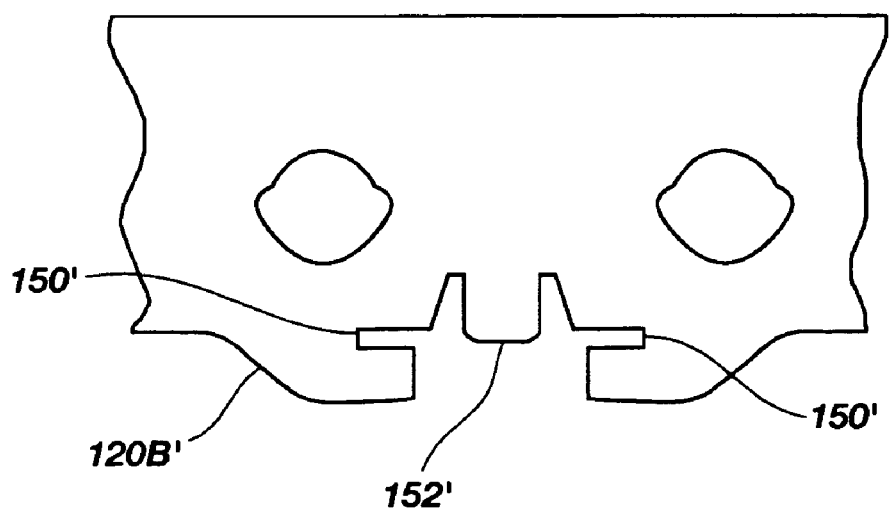

Referring to FIGS. 7, 9A and 9B, another embodiment is shown of interconnecting structures including a male interlocking element 120A' and a female interlocking element 120B'. The male and female interlocking elements 120A' and 120B' are configured generally similar to those described with respect to FIGS. 8A and 8C. For example, the male interlocking element includes two tapered fingers 144' extending outwardly from their respective longitudinal member 122'. However, instead of having a closed aperture 148 (FIG. 8A), a slot 148' is formed that exhibits an open profile such that a gap 149 is formed between the two fingers 144'. The female interlocking element 120B' includes a tongue 152', but also includes an open structure resulting in two side slots 150' (as opposed to the opening 150 shown and described with respect to FIG. 8C) configured to cooperatively receive the male interlocking element 120A'. Additionally, the tongue 152' engages the slot 148' of the male interlocking element 120A' when the male interlocking element 120A' has engaged the slots 150' of the female interlocking element 120B'. The open profile of the interlocking elements 120A' and 120B' to define slots 148' and 150' may provide added flexibility and ease of assembling and disassembling of structural side elements 106'. Such a configuration may be more amenable to certain types of fabrication processes (e.g., water jet cutting as opposed to laser cutting) depending on the types of materials being used and relative size of the features being fabricated for the locking elements 120A' and 120B'.

Figure 10A:
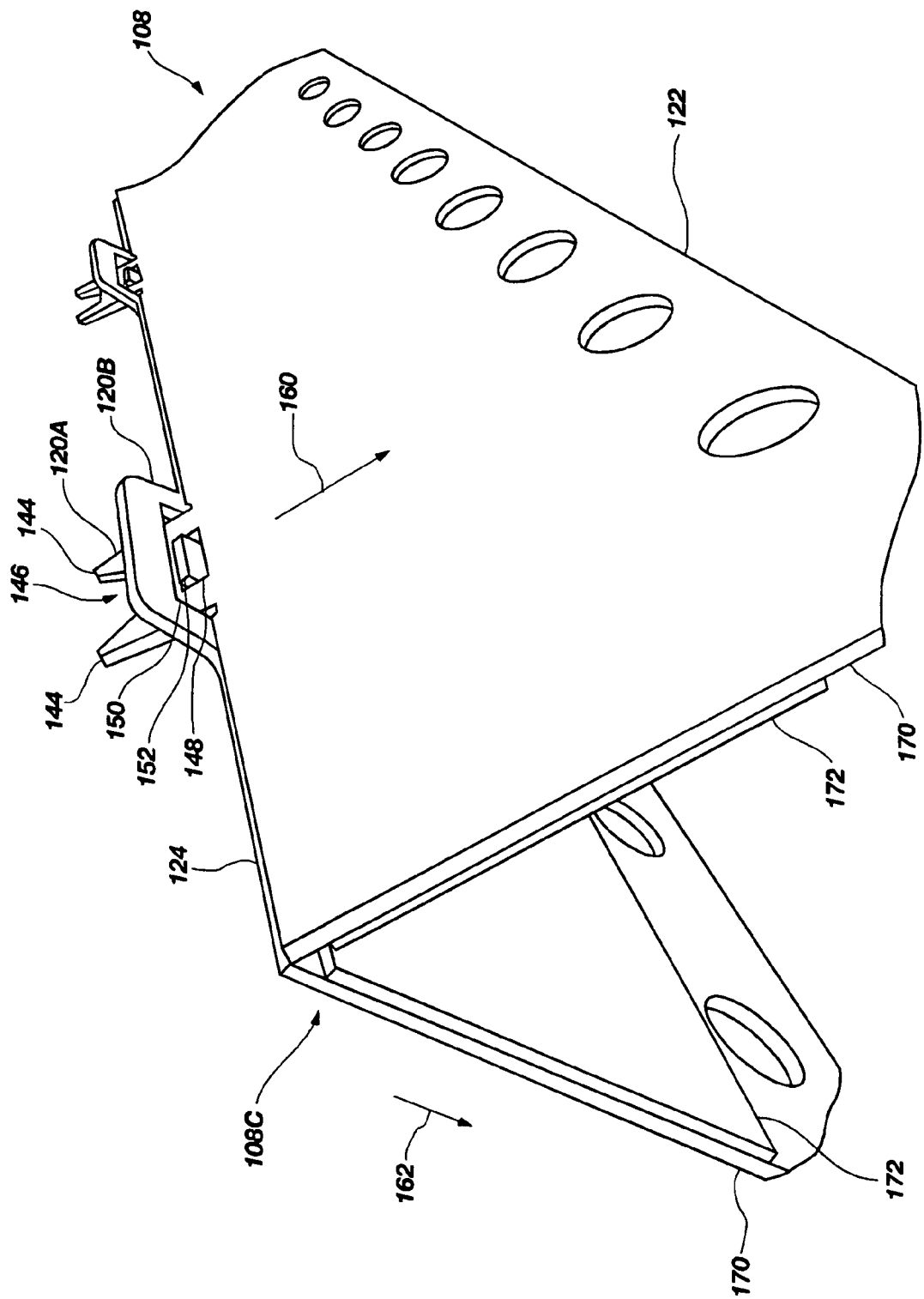
FIGS. 10A-10C show various views of two side structures interlocked with one another in accordance with the present invention.
Figure 10B:
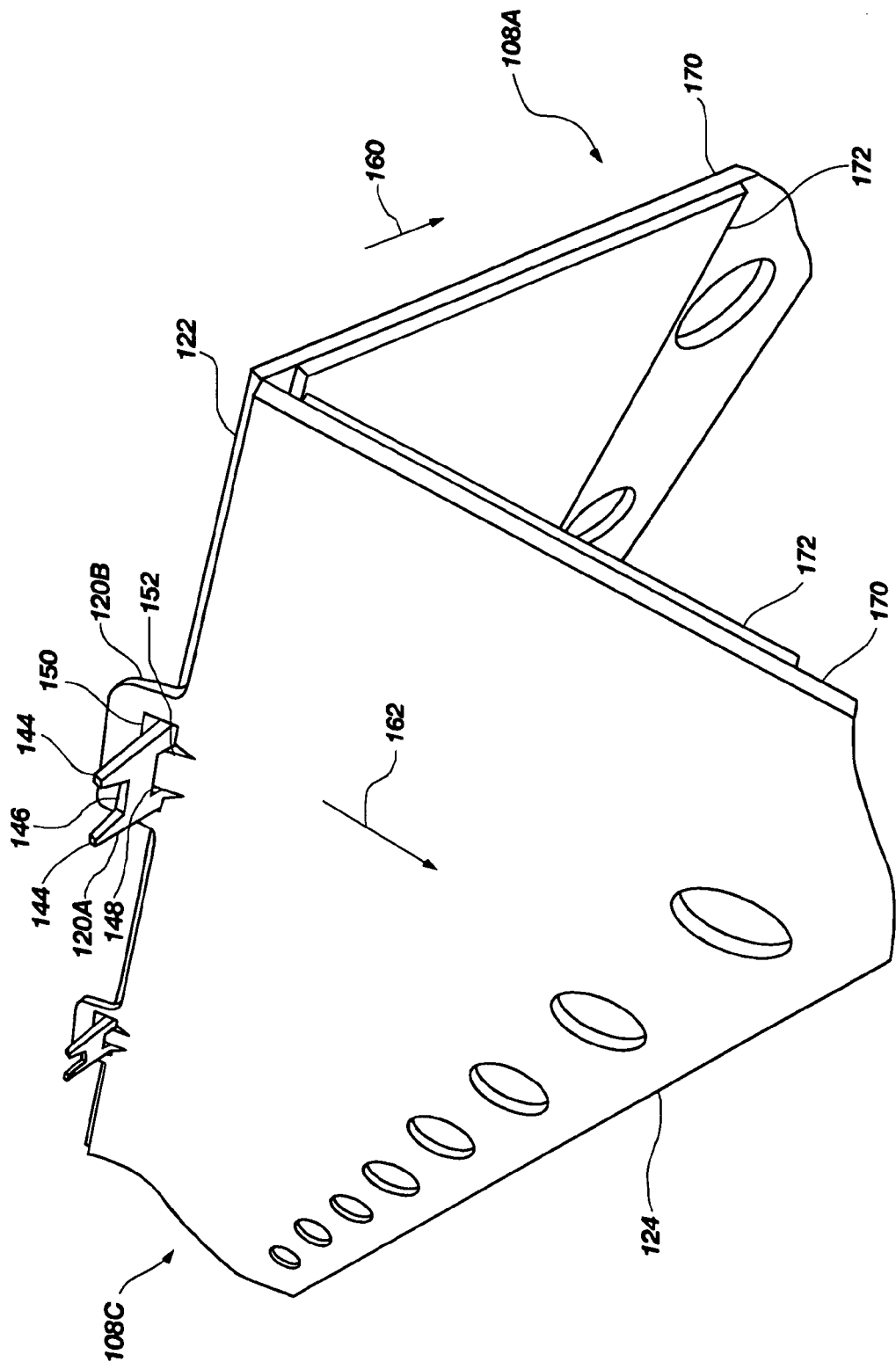
Figure 10C:
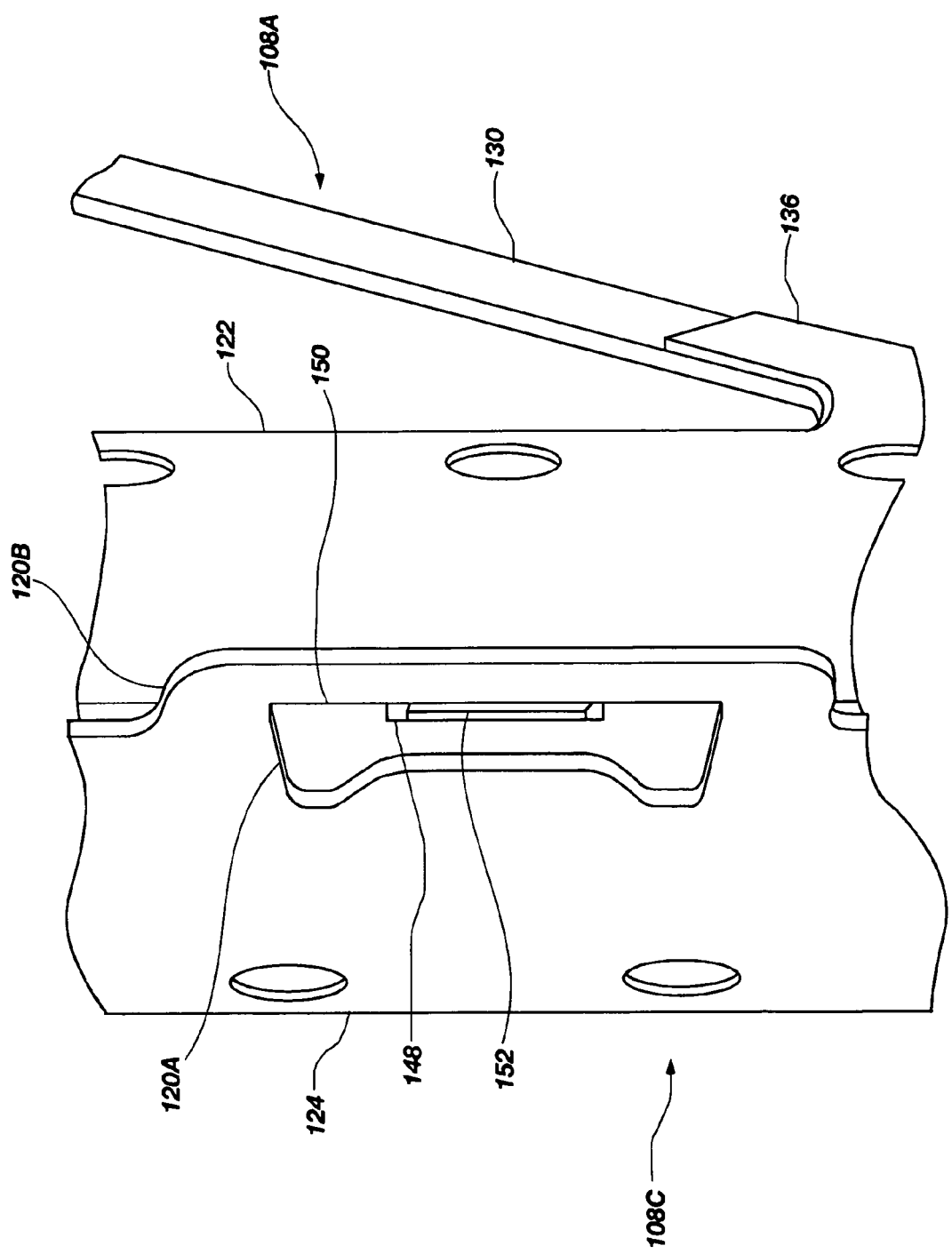

Referring to FIGS. 4, and 10A through 10C, the interconnection of a male interlocking element 120A and a female interlocking element 120B is shown and described. FIGS. 10A and 10B show right and left hand perspective views of two interlocked longitudinal members 122 and 124 while FIG. 10C shows a view of the two interlocked longitudinal members 122 and 124 from a position directly confronting the interlocked structure. As is shown in the drawings, the main portion of the male interlocking element 120A, including the fingers 144, extend through the opening 150 of the female interlocking element 120B. Additionally, the tongue 152 of the female interlocking element 120B extends through the aperture 148 of the male interlocking element 120A.

With the male interlocking element 120A engaged with the female interlocking element 120B, the extension of the tongue 152 through the aperture 148 of the male interlocking element 120A prevents the separation of the two longitudinal members 122 and 124 without a substantial force being applied to the longitudinal member 122 (and, therefore the associated structural side element 108) in the direction indicated by directional arrow 160 shown in FIGS. 10A and 10B (unless such force is applied between adjacent structural side elements at a longitudinal end of the boom 100 such as occurs when retracting the boom 100 for storage of the structural side elements 108A-108C as rolled members 106A-106C as further described hereinbelow). It is noted however, that when the boom 100 is in a deployed condition, such a force on the longitudinal member 122 and associated structural side element (e.g., 108A) would be counteracted, to a large degree, by the interlocking nature of the structural side element (e.g., 108A) with another structural side element (e.g., 108B). Additionally, the body portion of the female interlocking element 120B abuts the edge of the adjacent longitudinal member 122 and prevents the longitudinal member 122 from being displaced in a direction opposite that which is indicated by directional arrow 160.

Similarly, the engagement of the male interlocking element 120A with the opening 150 of the female interlocking element 120B serves to counteract any force applied in the direction indicated by directional arrow 162, or in a direction opposite thereto. Thus, an action substantially opposite to that of the deployment process, described in greater detail hereinbelow, is required to disassemble the interlocked structure.

Additionally, the interlocking elements 120A and 120B act as force transmitting members between adjacent structural side elements 108A-108C. For example, the outer peripheral surfaces of male interlocking element 120A will abut against the periphery of opening 150 in female interlocking element 120B to transfer any shear forces applied between adjacent structural side elements 108A-108C.

Various features of the interlocking elements 120A and 120B assist in effecting engagement and disengagement of the interlocking elements 120A and 120B. For example, the configuration of the fingers 144 on the male interlocking element 120A with the recess 146 defined therebetween enable the fingers 144 to easily align and preliminarily engage with the opening 150 of the female locking tab 120B prior to any interfering abutment that occurs between the peripheral edge of the recess 146 and the tongue 152 of the female interlocking element 120B. Once the fingers 144 are preliminarily engaged with the opening of the female interlocking element 120B, and upon further insertion of the male interlocking element 120A through the opening 150, the tongue 152 of the female locking tab 150 is deflected until the aperture 148 of the male interlocking element 120A is in a position to cooperatively engage the tongue 152. While the tongue 152 of the female interlocking element 120B helps to maintain a locked or secure relationship between the male and female interlocking elements 120A and 120B when the boom 100 is in a deployed state, the tongue 152 is formed of a flexible material enabling the tongue 152 to repeatedly deflect, thereby enabling efficient, effective, and repeatable engagement and disengagement of the male interlocking element 120A with the female interlocking element 120B.

It is noted that structures other than those described with respect to FIGS. 8A, 8C, 9A and 9B may be also used as interlocking elements 120A and 120B. For example, the male interlocking element 120A may be formed as a ball and the female interlocking element 102A may be formed as a complimentary socket. The socket may include an opening smaller than the diameter of the ball but which is flexible or deformable to allow the ball to extend through the opening and be securely received within the socket. Additionally, while the interlocking elements 120A and 120B have been described hereinabove as being formed as a unitary member with one or more components of the longitudinal members 122 and 124, such structures may be formed separately from the longitudinal members 122 and 124 and subsequently bonded thereto depending, for example, on the type of structure being used as an interlocking element or the materials being used to form the longitudinal members 122 and 124.

Referring to FIGS. 10A-10C, additional details of the construction of a structural side element 108A-108C may be seen. As described hereinabove, the longitudinal members 122 and 124 may be formed of a first flexible sheet of material 170, bonded to a second sheet of material 172 that exhibits high axial stiffness along the direction of its longitudinal extent. The interlocking elements 120A and 120B may be integrally formed with the flexible sheet of material 170 of the longitudinal member 122 and 124. As also noted hereinabove, the second sheet of material 172 may be sandwiched between the first sheet of material 170 and an additional sheet of material that may be the same as, or different from the first sheet of material 170. As shown in FIG. 10C, an integral tab of a longitudinal member 122 may be bonded or joined to a diagonal 130 or another structural member.

It is noted that the above described structural side elements 108A-108C are exemplary and that such structural side elements may be formed of other components and exhibit different configurations. For example, the structural side elements may be made of a high strength metal or metal alloy. Formation of a structural side element 108A-108C could include, for example, a metallic sheet exhibiting a thickness of, for example, 0.020 inch and which was rolled or "preyielded" during fabrication such that it exhibited a radius of curvature R in its natural or relaxed state. Additionally, besides use of different materials, the structural side elements may be formed as a substantially continuous sheet rather than as a truss member, or as a sheet having periodic cutouts for functional purposes (e.g., providing access to the interior of the boom 100 or for handholds or footholds) or for weight reduction.

Figure 11:
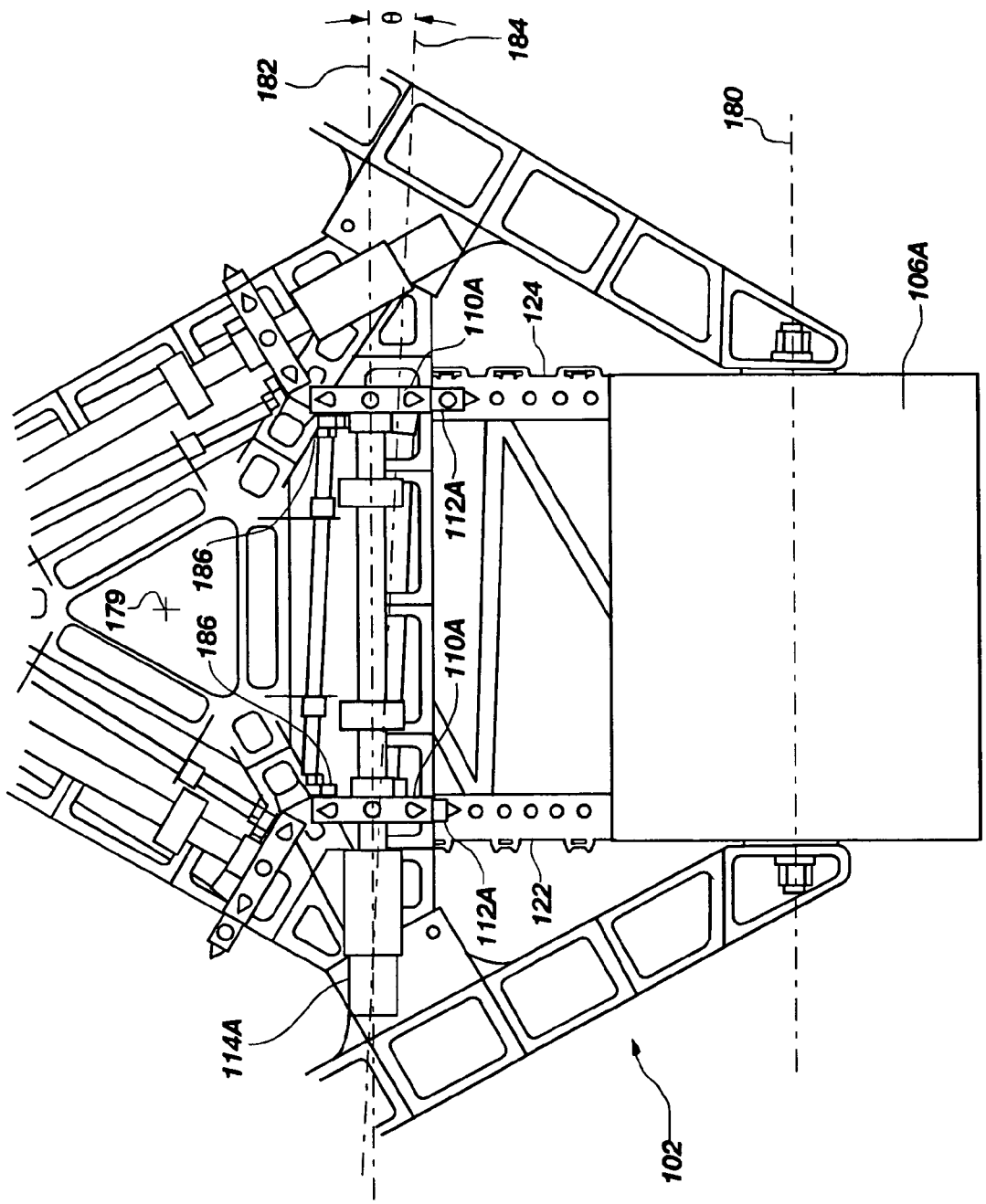
FIG. 11 shows an enlarged portion of the mechanism viewed in FIG. 3.

Referring now generally to FIGS. 1 through 11 with particular emphasis on FIGS. 3 and 11, the deployment of the boom 100 from the deployment mechanism 102 requires that the interlocking elements 120A and 120B of structural side elements 108A-108C be simultaneously engaged with one another as the structural side elements 108A-108C are dispensed from the rolled members 106A-106C and fed through associated guide rollers 112A-112C and drive rollers 110A-110C. In order to enable simple, efficient and simultaneous engagement of the male interlocking elements 120A of a given structural side element 108A-108C with the female interlocking elements 120B of adjacent structural side elements 108A-108C, the deployment mechanism 102 is configured to induce a twist in the structural side elements 108A-108C relative to the deployment mechanism 102 and relative to one another as the structural side elements 108A-108C are being deployed.

For example, as shown in FIG. 3, an internal frame component 104A extends substantially parallel to the face of an adjacent structural side element 108A when it is in a deployed condition as part of the boom 100. However, the associated rolled member 106A is disposed to rotate about an axis 180 that is skewed or angled relative to an axis 182 of the drive rollers 110A and, more importantly, relative to the face of the deployed structural side element 108A. Similarly, the guide rollers 112A rotate about an axis 184 that is angled relative to the axis 182 of the drive rollers 110A. In one embodiment, the axis 180 of the associated rolled member 106A may be substantially parallel to the axis 184 of guide rollers 112A.

A transition takes place, for example, between the guide rollers 112A and the drive rollers 110A to induce a twist in the structural side element 108A. The transition may cause displacement of the structural side element 108A generally towards the cross-sectional center 179 of the resulting boom 100, but more particularly causes the structural side element 108A to twist or rotate such that one longitudinal member 124 of a given section of a structural side element 108A is displaced a larger distance than the other longitudinal member 122 of the same section of the structural side member 108A. This can be seen by the fact that the drive rollers 110A are angularly offset relative to the guide rollers 112A about their relative axes 182 and 184 of rotation. In other words, the axis of rotation 182 of the drive rollers 110A is disposed at an angle θ relative to the axis of rotation 184 of the guide rollers 112A.

It is noted that in other embodiments, the axis 180 of the rolled member 106A may be rotated and repositioned, for example, to increase storing efficiency. For example, one or more of the rolled members 106A-106C may be placed at a location relative to the deployment mechanism 102, which is substantially opposite to the side of the deployment mechanism from which the boom 100 is deployed in order to accommodate a narrow envelope. It is also noted that the axis 180 of a rolled member 106A may be rotated any degree relative to axis 184 as long as the appropriate distance is given between axis 180 and 184 to allow for twisting of the side element without damage. Such flexibility in configuration enables the deployment mechanism 102 and associated rolled members 106A-106C to be installed and utilized in a variety of environments and in association with numerous applications.

Still referring to FIGS. 3 and 11, a transition element or structure may be used to aid the twisting transition of the structural side element 108A. For example, one or more transition rollers 186 may be positioned and configured to assist the structural side element transition 108A from the guide rollers 112A to the drive rollers 110A. The transition rollers 186 may also include pins or other structure configured to engage the indexing structures 118 of the structural side element 108A. Multiple rollers, or sets of rollers, may be used to assist in this transition depending, for example, the amount of twist that is to be induced in the structural side element 108A or the distance through which a portion of the structural side element 108A travels during the twisting transition thereof. Of course other structures or mechanisms may be used to assist the twisting transition of the structural side element 108A. For example, an angled or curved plate may be placed adjacent the path of the structural side element 108A as it traverses the transition zone (e.g., from the guide rollers 112A to the drive rollers 110A).

The twisting transition of the structural side rails 108A-108C effects efficient engagement of the interlocking structures 120 during deployment of the structural side rails 108A-108C. This can be seen with reference to FIGS. 12A through 12C. FIG. 12A shows the structural side elements 108A-108C (the deployment mechanism 102 is not shown for purposes of clarity) prior to their assembly into the boom 100 (FIGS. 1 and 4).

Figure 12B:
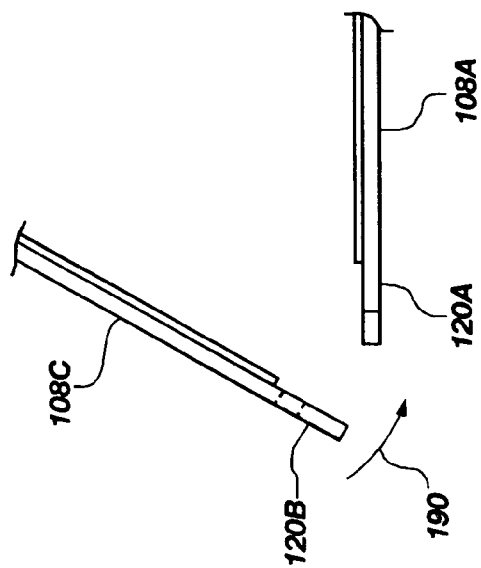
FIGS. 12B and 12C are enlarged details of the side structures as indicated in FIG. 12A showing the side structures before interlocking and after interlocking thereof respectively.

As seen in FIG. 12B, the male interlocking element 120A and female interlocking element 120B of adjacent side elements 108A and 108C are positioned generally adjacent each other prior the structural side elements 108A and 108C being subjected to a twisting transition as discussed hereinabove. As the structural side elements 108A and 108C pass through a transition zone, they experience a twisting displacement such that the female interlocking element 120B is displaced toward the male interlocking element 120A as indicated by directional arrow 190.

Figure 12C:
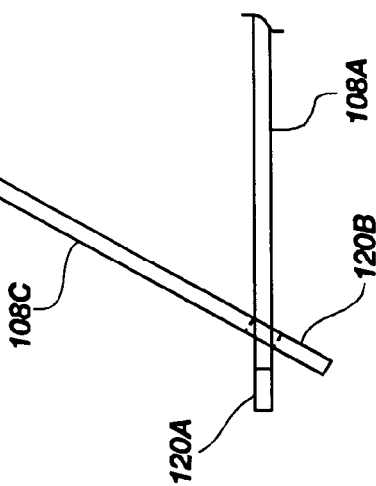
Figure 12A:
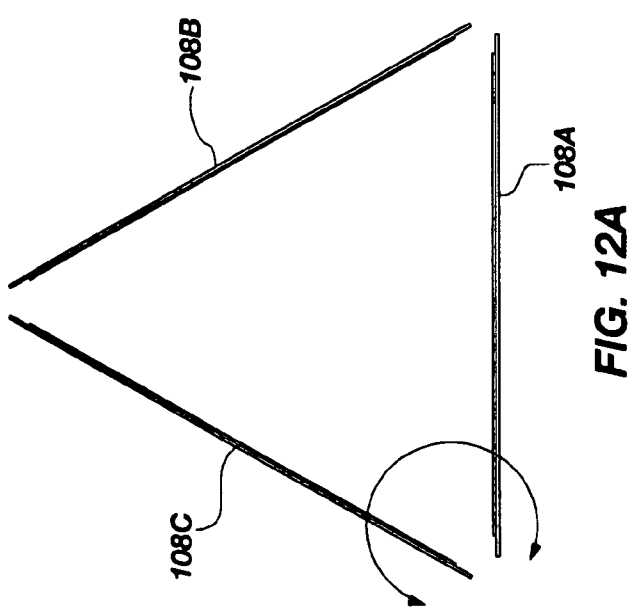
FIG. 12A is a schematic showing the orientation of a plurality of side structures prior to the interlocking thereof during deployment of a structural assembly in accordance with an embodiment of the present invention.
Figure 13A:
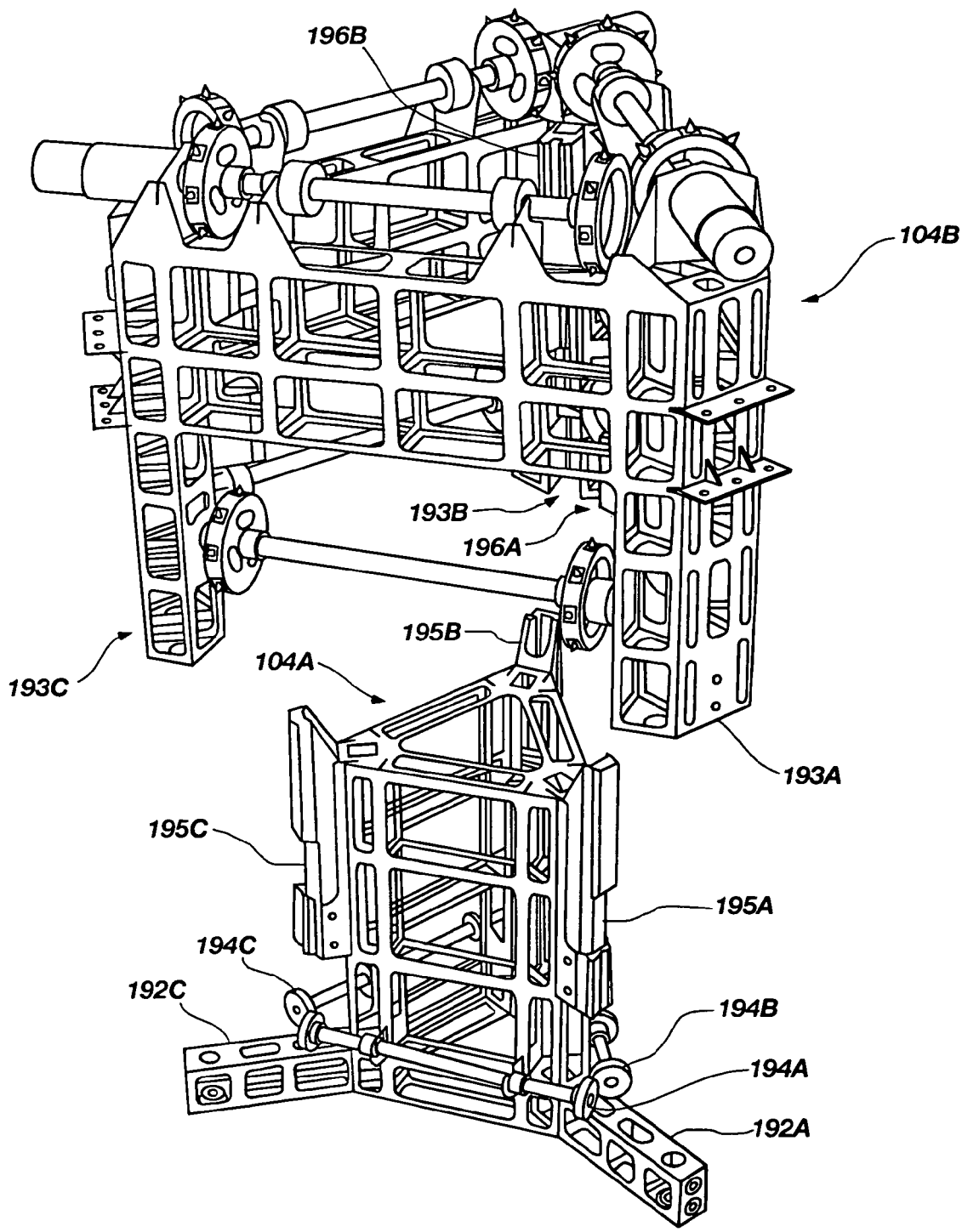
FIGS. 13A and 13B are partially exploded perspective views of frame components used in accordance with one embodiment of the present invention.
Figure 13B:
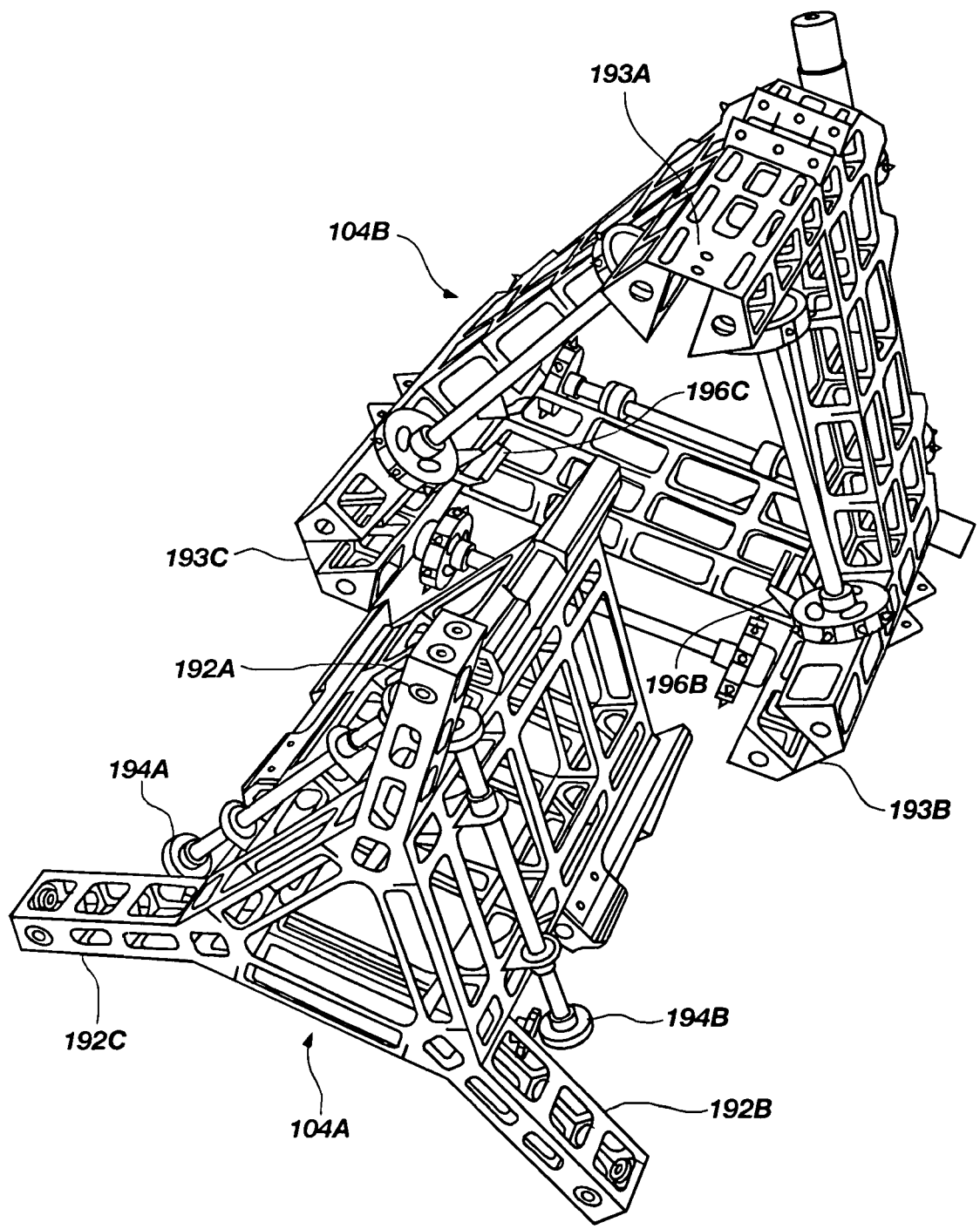
Figure 14:
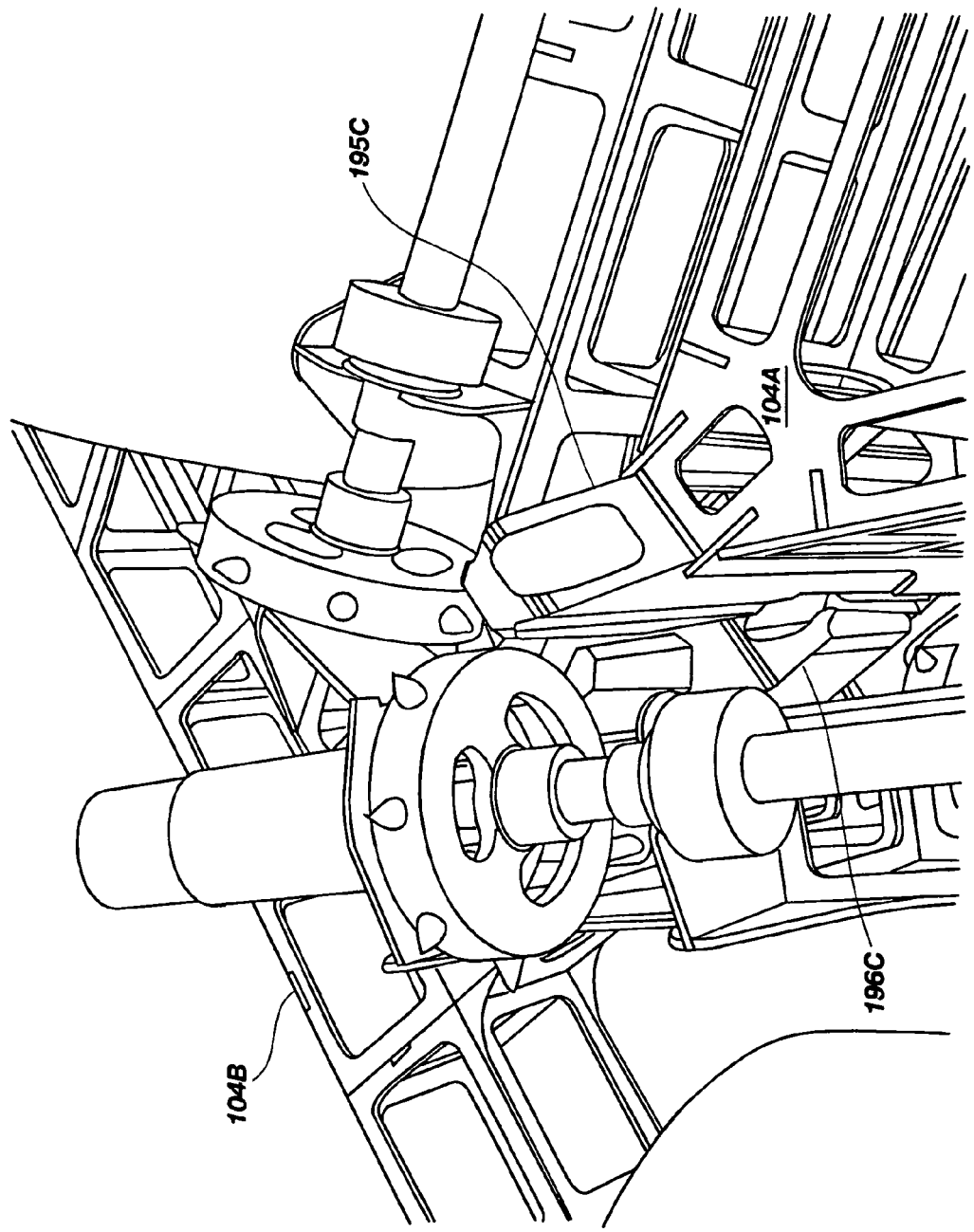
FIG. 14 is an enlarged view of a portion of a deployment mechanism in accordance with an embodiment of the present invention.

As shown in FIG. 12C, the twisting action induced in the structural side element 108C and the accompanying displacement of the female interlocking element 120B thereof results in the female interlocking element 120B engaging the male interlocking element 120A of the adjacent structural side element 108A in a manner such as described herein above with respect to FIGS. 4 and 10A through 10C. In one embodiment, the amount of twist induced into the structural side element 108A is approximately 2°, although other angles of twist may be utilized. This angle, whether it be 2° or some other magnitude, corresponds with the angle θ defined between the axis 182 of rotation of the drive rollers 110A and the axis 184 of rotation of the guide rollers 112A.

While the interlocking of two adjacent structural side elements 108A and 108C has been shown and described with respect to FIGS. 12B and 12C, it will be understood that the same twisting action takes place with respect to each of the structural side elements 108A-108C such that each of them become interconnected with each adjacent structural side element 108A-108C in a substantially simultaneous manner.

Referring now to FIGS. 2, 3, 13A, 13B and 14, additional detail is shown regarding the frame 104 of the deployment mechanism, including an internal frame component 104A and an external frame component 104B, in accordance with an embodiment of the present invention. The internal frame component 104A is configured to be cooperatively disposed within a central opening defined by the external frame component 104B. The internal frame component 104A includes structural members 192A-192C, which extend generally radially from the internal frame component 104A and are configured for structural coupling with the external frame component 104B at defined coupling locations 193A-193C. The internal frame component 104A may also have a plurality of rollers 194A-194C attached thereto that may serve as transition rollers (such as described hereinabove for assisting the twisting transition of the structural side elements 108A-108C), as additional guide rollers or as both.

The internal frame component 104A may further include guide elements 195A-195C (referred to herein as internal guide elements for sake of clarity) configured to assist in guiding structural side elements 108A-108C during deployment of the boom 100. Complementary guide elements 196A-196C (referred to herein as external guide elements) are coupled to the external frame component 104B such that, when the internal and external frame components 104A and 104B are assembled and coupled together, the internal guide elements 195A-195C and the external guide elements 196A-196C are disposed adjacent each other in a spaced relationship to accommodate portions of structural side elements 108A-108C to pass therebetween. For example, referring to FIG. 14, an enlarged partial view of the assembled deployment mechanism 102 is shown with the internal and external frame components 104A and 104B assembled and showing the positional relationship of two complementary internal and external guide elements 195C and 196C.

Figure 15A:
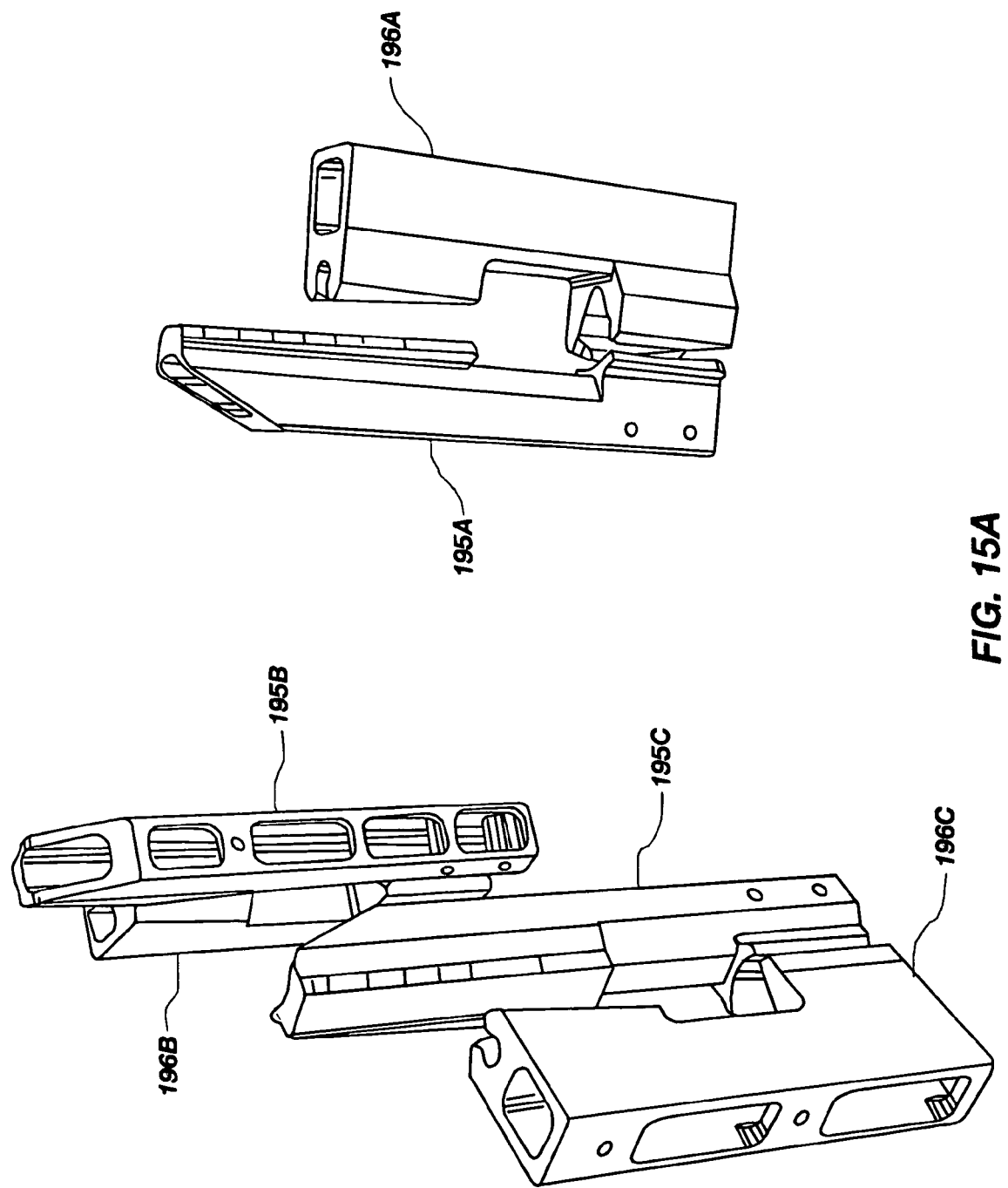
FIGS. 15A and 15B show guides utilized with the frame components of FIGS. 13A and 13B in accordance with an embodiment of the present invention.
Figure 15B:
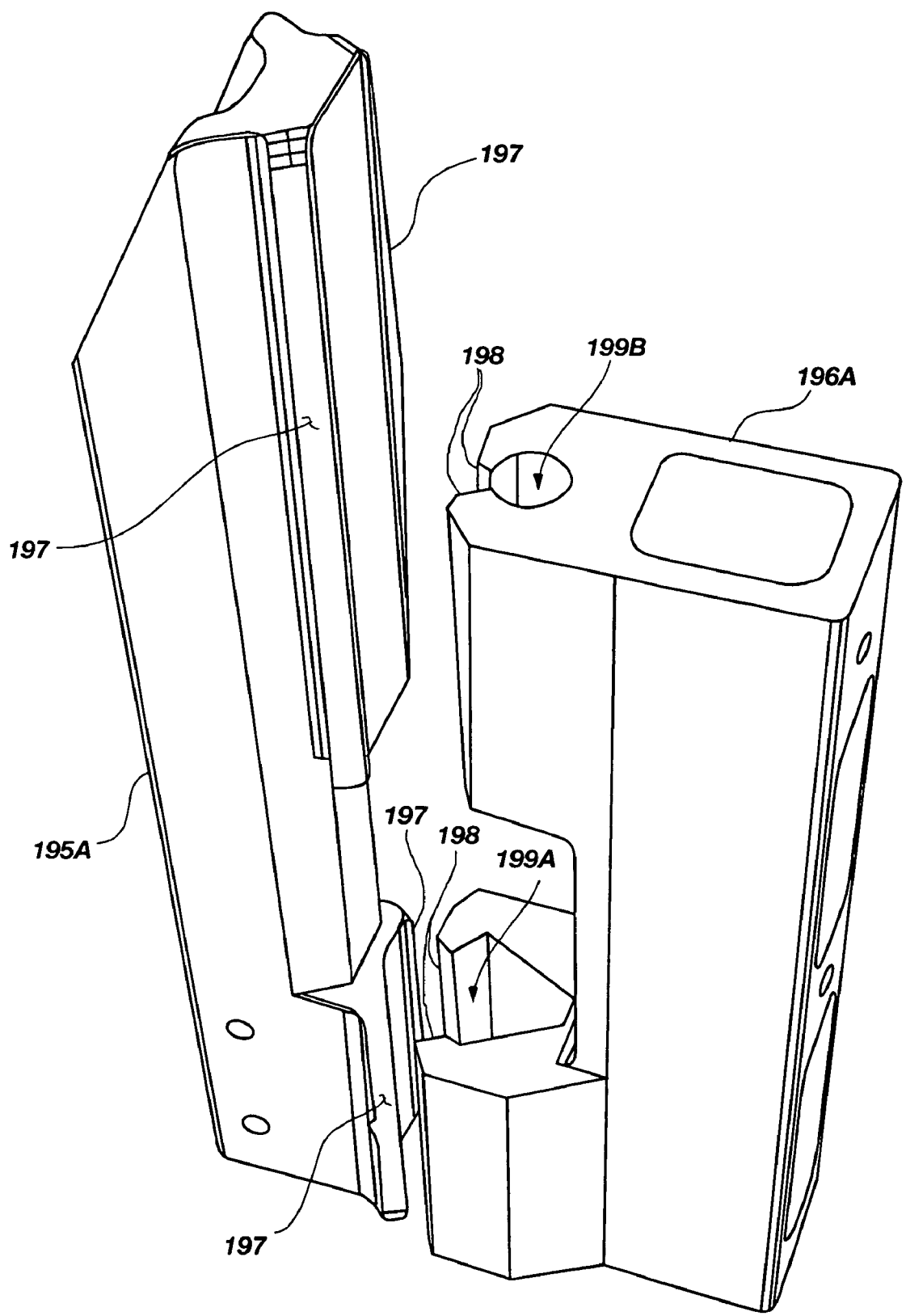

Referring briefly to FIGS. 15A and 15B while still referring to FIGS. 2, 3, 13A, 13B and 14, the internal and external guides 195A-195C and 196A-196C are shown in the positions they would assume relative to one another upon assembly of the deployment mechanism 102 but without showing the frame 104 or other components for purposes of clarity. As previously stated, the internal and external guides 195A-195C and 196A-196C are placed in a complementary spaced relationship with one another. The internal guides 195A-195C include engagement surfaces 197, which are positioned and configured to contact portions of structural side elements 108A-108C on a first side thereof (such as a first side of the longitudinal members 122 and 124) in a sliding manner while the structural side elements 108A-108C are being deployed. Similarly, the external guides 196A-196C include engagement surfaces 198, which are positioned and configured to contact portions of structural side elements 108A-108C on a second, opposing surface thereof in a sliding manner while the structural side elements 108A-108C are being deployed.

The internal and external guides 195A-195C and 196A-196C, therefore, cooperatively control the positioning of the structural side elements 108A-108C during deployment thereof in order to effect sequential engagement of corresponding interlocking elements 120A and 120B of adjacent structural side elements (e.g., 108A and 108B). Channels 199A and 199B are defined in the external guides 196A-196B to accommodate the portions of the interlocking elements 120A and 120B that protrude laterally beyond the edge of their associated longitudinal members 122 and 124. It is noted that other components might be used as internal or external guides 195A-195C and 196A-196C. For example, in one embodiment, the internal guides 195A-195C, the external guides 196A-196C, or both, may include one or more rollers configured to engage the longitudinal members 122 and 124 in a rolling manner. Such rollers could be free rolling or driven. Additionally, the rollers could be adjustable for precise positional control of the longitudinal members 122 and 124 as the structural side elements 108A-108C are being deployed or retracted. Using a plurality of adjustable rollers sequentially encountered by the longitudinal members 122 and 124 would enable even more precise control of such positioning. Of course, the internal and external guides 195A-195C and 196A-196C, as shown and described with respect to FIGS. 15A and 15B may also be positionably adjustable in a similar manner.

The internal and external guides 195A-195C and 196A-196C may also serve to support the boom 100 while it is in a deployed state. For example, when the boom 100 is deployed, or even partially deployed, each structural side element 108A-108C includes a portion disposed between the lower end of the frame 104 and the upper end of the frame 104 that is not yet interconnected with the adjacent structural side elements 108A-108C since that is a location or a zone in which the interlocking elements 120A and 120B of adjacent structural side elements 108A-108C are being placed in engagement with one another. Thus, since there is not a complete engagement or coupling of structural side elements 108A-108C within that defined zone, if there were inadequate support of each structural side element 108A-108C at the location of complete engagement, each structural side element 108A-108C would be subject to buckling upon application of a load thereto without additional support. The internal and external guides 195A-195C and 196A-196C may provide lateral support (e.g., in a direction extending between the internal guides 195A-195C and each associated external guide 196A-196C) to the structural side elements 108A-108C in the region between the lower end and the upper end of the frame 104 to prevent buckling of the structural side elements 108A-108C in that region.

However, even with such lateral support provided by the internal and external guides 195A-195C and 196A-196C, it may be desirable to ensure structural stability at a location along each structural side element 108A-108C where the associated interlocking elements 120A and 120B are completely engaged with one another. For example, proper engagement of the pins 116 with the indexing structures 118 and positional control of the drive rollers 110A-110C by the associated drives 114A-114C may effectively "lock" the structural side elements 108A-108C in a fixed position and prevent any load transmitted through the deployed portions of the structural side elements 108A-108C from being transmitted into the portions of the structural side elements 108A-108C located within the transitional zone of the deployment mechanism 102.

Other structures or mechanisms may similarly be used to help prevent transmittal of a load into unjoined portions of the structural side elements 108A-108C. For example, a tractor tread device having pins or other structural elements for engagement with indexing structures 118 may be used in addition to, or in place of the drive rollers 110A-110C. Such a device may provide additional points of engagement with the longitudinal members 122 and 124 such as by having multiple pins 116 or other structural elements engaged simultaneously with a given longitudinal members 122 or 124. Additionally, a tractor tread engagement mechanism may have a greater surface area for contact with the longitudinal members 122 and 124 lending even further stability.

Referring generally to the drawings, the interlocking of the structural side elements 108A-108C results in a space frame or a space truss configured as a boom 100 that, when configured, arranged and deployed as discussed herein, provides numerous advantages over various prior art structures. For example, the exemplary boom 100 disclosed herein may be extended to lengths (or heights) exceeding 100 meters. The boom 100 of the present invention is also scalable in design such that various lengths, cross-sectional sizes and load capacities may be provided. Additionally, such a boom 100 may be constructed with lightweight materials, such as those described hereinabove, such that its mass-to-length ration is 68 grams per meter or less while maintaining a bending stiffness, EI, of approximately 1500 Newton-meters squared (N-m$^2$) or more (where E is the modulus of elasticity and I is the cross-sectional moment of inertia of the boom 100) and while also exhibiting good damping characteristics and a near zero CTE.

As already noted, the exemplary boom 100 constructed of the combination of materials disclosed herein may be configured to exhibit a net or average coefficient of thermal expansion that is nearly zero (taking into consideration the numerous components from which the boom may be constructed). Furthermore, the boom 100 of the present invention is highly storable and has a low amount of stored energy when the structural side elements 108A-108C are retracted and stored as rolled elements 106A-106C. For example, in one embodiment, the packing factor of the boom 100 may be, for example, as small as ten or less. It is noted that the "packing factor" has been defined as a ratio of "stowed volume" to "boom material volume," wherein stowed volume is the encompassing volume of the stowed boom and its deployment mechanism including any nonusable space, and wherein boom material volume is the volume of structural materials used for the boom 100. Regardless of the formal definition of the packing factor, the deployed volume of the boom 100 is considerably greater than the volume of the stowed apparatus including the structural side elements 108A-108C and the deployment mechanism.

Figure 16:
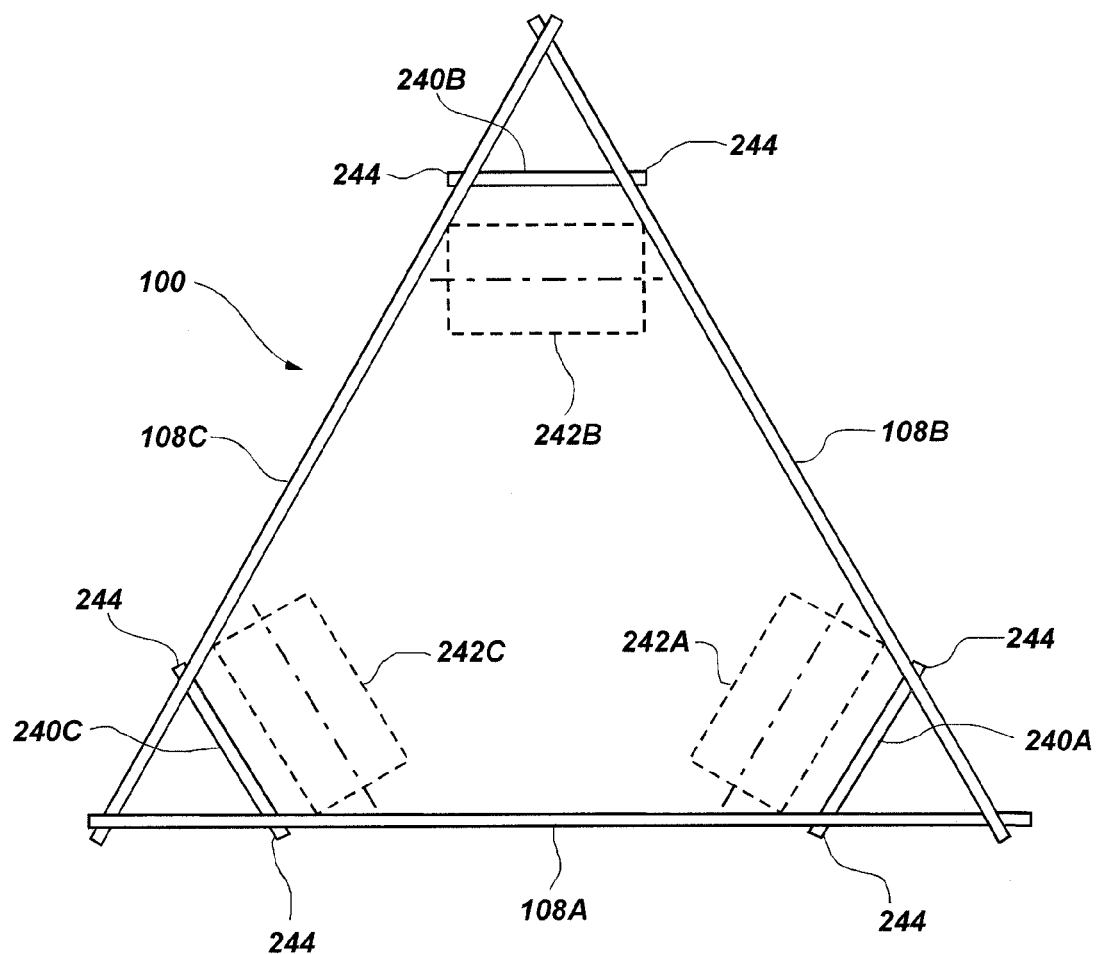
FIG. 16 is an end view of a structural assembly in a deployed or partially deployed state in accordance with another embodiment of the present invention.

Referring to FIG. 16, an end view of the boom 100 is depicted showing that additional components may be introduced to the boom 100 to provide additional strength and stiffness to the boom 100 when in a deployed state. It is noted that the deployment mechanism is not shown in FIG. 16 for purposes of clarity. In one exemplary embodiment, structural reinforcing members 240A-240C may be releasably coupled between adjacent structural side elements 108A-108C. Thus, for example, a furlable structural reinforcing member 240A may be deployed from a stowed state (e.g., from a rolled member 242A-242C shown in dashed lines) in conjunction with the deployment of the structural side elements 108A-

108C and coupled with a first structural side element 108A and an adjacent structural side element 108B. The structural reinforcing member 240A may be releasably coupled to the adjacent structural side elements 108A and 108B using interlocking elements 244 in a manner similar to the releasable connection of structural side elements 108A-108C described hereinabove. Interconnection of the structural reinforcing members 240A-240C provides further stiffness and rigidity to the deployed boom 100 by increasing the structural hierarchy thereof.

In one embodiment, interlocking elements 244 of the structural reinforcing members 240A-240C may engage indexing structures 118 (see FIG. 5) of the structural side elements 108A-108C. In another embodiment, separate interlocking elements may be provided on the structural side elements 108A-108C to enable a releasable connection with the structural reinforcing member 240A-240C.

The structural reinforcing members 240A-240C may interconnect with their respective structural side elements 108A-108C substantially simultaneously with the interconnection of adjacent structural side elements 108A-108C, sequentially thereafter. An appropriate drive mechanism may be associated with the structural reinforcement members for deployment as well as retraction and storage thereof in a manner similar to that which has been described with respect to the structural side elements 108A-108C.

Figure 17:
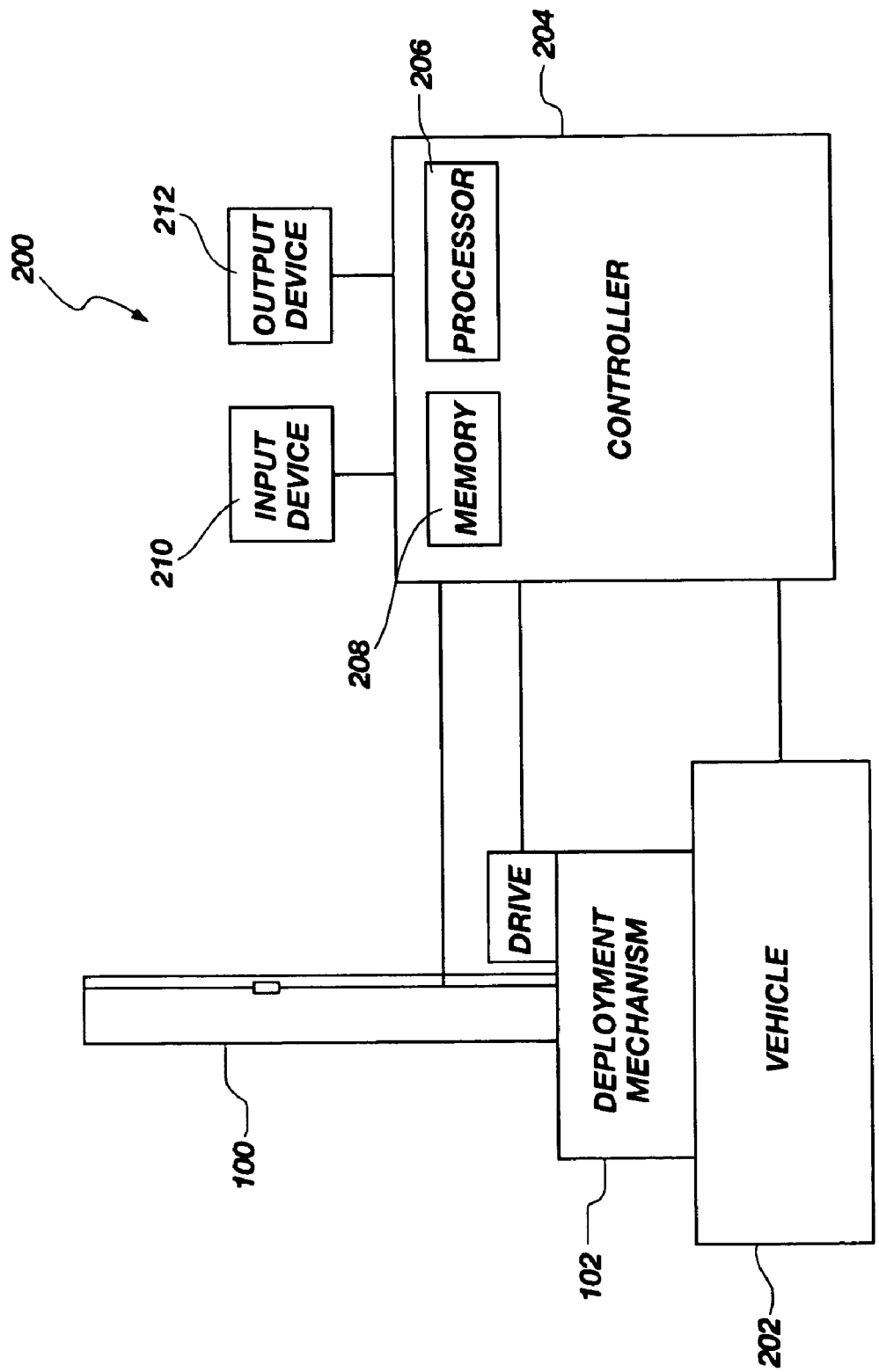
FIG. 17 is a schematic showing a system incorporating a deployable structural assembly in accordance with an embodiment of the present invention.

Referring now to FIG. 17, a system 200 is shown that incorporates the exemplary boom 100 and deployment mechanism 102 of the present invention. The boom 100 and deployment mechanism 102 may be coupled to a vehicle 202 such as, for example, an aerospace vehicle or a land based emergency vehicle. However, the boom 100 need not be coupled to a vehicle 202 for operation and may be coupled to a stationary structure or may operate as a stand-alone unit. A controller 204 is cooperatively coupled with the drive mechanisms 114A-114C (FIG. 3) of the deployment mechanism 102 to control, for example, the direction and speed of rotation of such drive mechanisms 114A-114C.

The controller 204 may be a dedicated controller or it may generally include a processor 206, such as central processing unit; memory 208, such as random access memory (RAM); an input device 210, such as a keyboard, a mouse or a touchpad; and an output device 212, such as a display or a printer. The controller 204 may be used to control the deployment and the retraction of the boom 100 and, further, may be utilized to control one or more functions of the vehicle 202, such as the positioning of the vehicle 202. Additionally, if any electronics, such as sensors 140 or conductors 142 are integrated or otherwise coupled to the boom 100, the controller 204 may be operably coupled therewith.

In one embodiment, the sensors 140 and/or conductors 142 may be used to detect whether adequate engagement has been made of corresponding interlocking elements 120A and 120B. For example, the contact of independent conductors 140 associated with interlocking elements 120A and 120B may provide a positive indication that engagement of such members has been accomplished. Such a check might occur at each pair of corresponding interlocking elements 120A and 120B, or at specified interlocking elements 120A and 120B in a periodic fashion. In another embodiment, an optical sensor might be used, for example, to determine whether a gap between mating longitudinal members 122 and 124 exceeds a defined measurement when a force is applied in an attempt to pull the deployed structural side elements 108A-108C apart shortly after engagement of associated interlocking elements 120A and 120B. Detection of a gap that exceeds a specified magnitude would indicate that positive engagement of interlocking elements 120A and 120B did not occur. Upon detection of a failed engagement of interlocking elements 120A and 120B, the control system 200 might be configured to automatically reverse the direction of the drive rollers 110A-110C, thereby retracting the structural side elements 108A-108C a specified distance, and then redeploy the structural side elements 108A-108C in an effort to ensure the positive engagement of interlocking elements 120A and 120B. In other words, such electronic components, in association with an appropriate control system, may be used to verify and ensure engagement of each, or a specified minimum number, of corresponding interlocking elements 120A and 120B.

Figure 18:
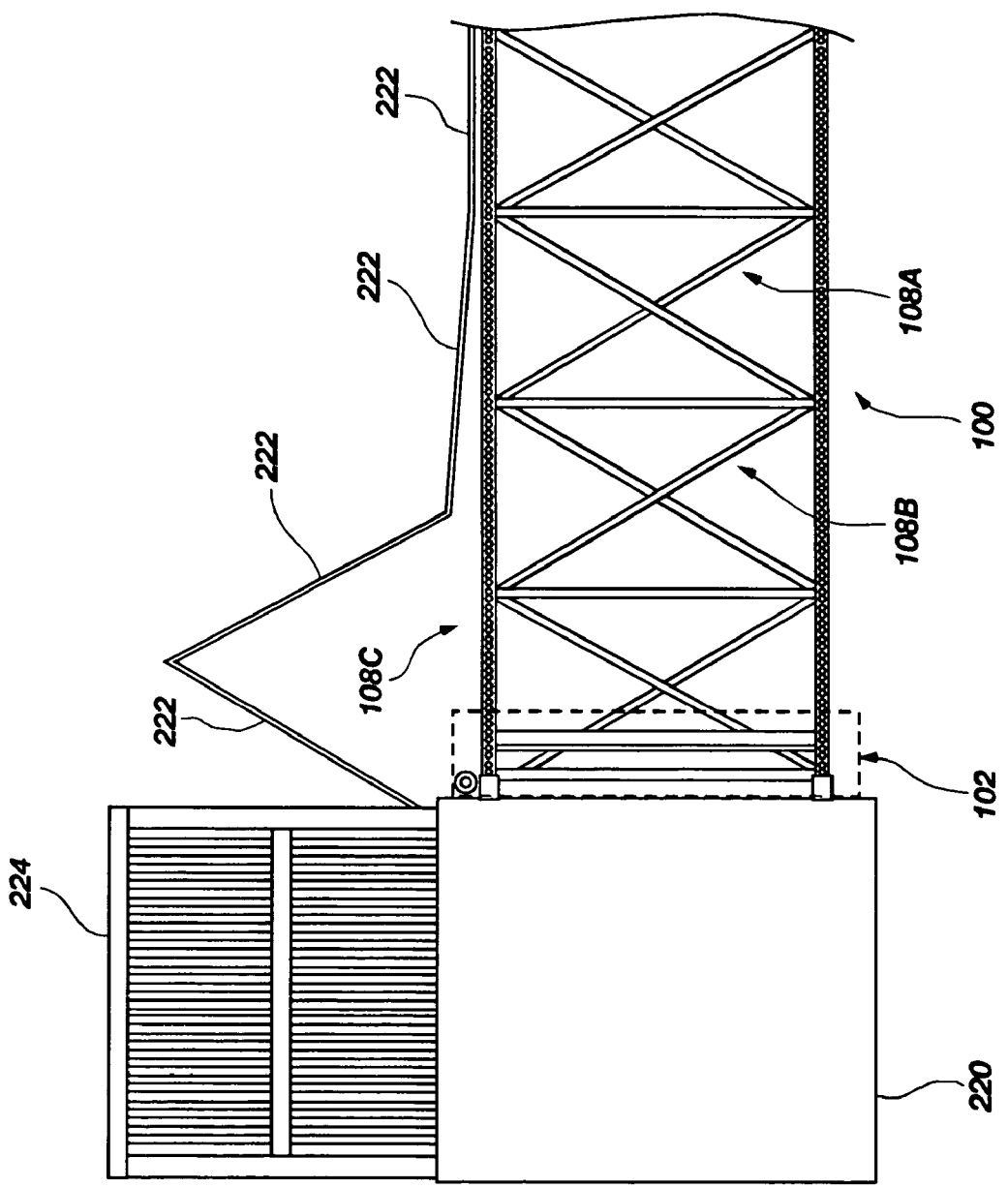
FIG. 18 shows another system incorporating a deployable structural assembly in accordance with another embodiment of the present invention.

Referring now to FIG. 18, an exemplary use of the deployable structural assembly 100 is shown. The deployment mechanism 102 is coupled to a structure 220, which may include, for example, a satellite, a space station, a lunar station or some other terrestrial or extraterrestrial structure or vehicle. A plurality of hinged panels 222 may be deployed from a storage structure 224 concurrently with deployment of the boom 100 and disposed on one or more of the structural side elements 108A-108C to form a desired structure. The deployed panels 222 may include, for example, synthetic aperture sandwich panels, which may be used for a space based radar system or a solar array panel. Of course, the panels 222 may comprise other components and be used for other functions.

In another embodiment, rather than a plurality of hinged panels 222, another furlable component may be deployed with the boom 100. For example, a canopy may be deployed with the boom 100 to act as a shield on a lunar base. Thus, the boom 100 may act as a backbone structure that may be populated with one or more functional components, systems or subsystems. The present invention provides for a variety of configurations using the boom 100 as a backbone structure. For example, solar array components might be integrated directly into one or more structural side elements 108A-108C. In one embodiment, at least one of the structural side elements may be populated with solar array panels while at least one other structural side element may be populated with a synthetic aperture panel. In another embodiment, multiple booms 100 may be employed, each boom 100 being populated with components similar or different from the other booms. Of course, such uses of the boom 100 are exemplary and numerous other uses and environments of use are contemplated, including a variety of components that may be used to populate the boom 100, as will be appreciated by those of ordinary skill in the art.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention includes all modifications, equivalents, and alternatives falling within the spirit and scope of the invention as defined by the following appended claims.

What is claimed is:

1. An apparatus including a deployable structural assembly comprising:

at least three structural side elements, each of the at least three structural side elements formed from at least one sheet of material and comprising a furlable truss structure, each furlable truss structure comprising:
a first longitudinal member;
a second longitudinal member spaced apart from the first longitudinal member;

a plurality of cross-members, each cross-member of the plurality extending substantially transversely between and coupled with the first longitudinal member and the second longitudinal member;

a plurality of diagonal members, each of the plurality of diagonal members extending between and being coupled with the first longitudinal member and the second longitudinal member and each diagonal member of the plurality extending at an angle relative to an adjacent cross-member of the plurality of cross-members;

a first plurality of interlocking elements formed in the first longitudinal member; and a second plurality of interlocking elements formed in the second longitudinal member, at least one interlocking element of the second plurality of interlocking elements comprising an opening formed therein;

wherein a portion of at least one interlocking element of the first plurality of interlocking elements of one of the at least three structural side elements is configured to releasably engage within the opening formed in the at least one interlocking element of the second plurality of interlocking elements of an adjacent structural side element of the at least three structural side elements.

2. The apparatus of claim 1, wherein the first plurality of interlocking elements includes a plurality of male interlocking elements and wherein the second plurality of interlocking elements includes a plurality of female interlocking elements.

3. The apparatus of claim 2, wherein each of the first plurality of interlocking elements includes a pair of laterally spaced fingers extending outwardly from their associated first longitudinal member.

4. The apparatus of claim 3, wherein the pair of laterally spaced fingers define a recess therebetween.

5. The apparatus of claim 3, wherein each of the second plurality of interlocking elements further comprises a tongue extending into the opening, each tongue being sized, configured and positioned to engage an aperture formed in one interlocking element of the first plurality of interlocking elements.

6. The apparatus of claim 5, wherein the pair of fingers is configured to preliminarily engage the opening without interference from the tongue.

7. The apparatus of claim 6, wherein the pair of laterally spaced fingers define a recess therebetween and wherein the recess is configured to contact and deflect the tongue during insertion of the one of the first plurality of interlocking elements into the opening.

8. The apparatus of claim 7, wherein the first plurality of interlocking elements is integrally formed with the first longitudinal member and, wherein the second plurality of interlocking elements is integrally formed with the second longitudinal member.

9. The apparatus of claim 1, wherein the first longitudinal member and the second longitudinal member each include a first layer of material comprising a fiber reinforced composite material.

10. The apparatus of claim 9, wherein the first longitudinal member and the second longitudinal member further include a second layer of material bonded to the first layer of material, the second layer of material comprising a different material than the first layer of material.

11. The apparatus of claim 9, wherein the plurality of cross-members a formed of a material comprise at least one of titanium, aluminum, and copper beryllium.

12. The apparatus of claim 1, wherein the first longitudinal member and the second longitudinal member are furlable while the plurality of cross-members are substantially unfurlable.

13. The apparatus of claim 1, wherein the first longitudinal member, the second longitudinal member, the plurality of cross-members and the plurality of diagonal members are formed as a unitary structure as a common material layer.

14. The apparatus of claim 13, further comprising at least one layer of material bonded to each of the first longitudinal member and the second longitudinal member.

15. The apparatus of claim 13, further comprising a layer of at least one of titanium aluminum, and copper beryllium bonded to each of the plurality of cross-members.

16. The apparatus of claim 1, wherein each of the at least three structural side elements exhibit a length of approximately 100 meters or greater.

17. The apparatus of claim 1, further comprising at least one electronic component integrated with at least one of the at least three structural side elements.

18. The apparatus of claim 17, wherein the at least one electronic component includes at least one sensor.

19. The apparatus of claim 17, wherein the at least one electronic component includes at least one conductor.

20. The apparatus of claim 19, wherein the at least one conductor is configured to transmit an electrical signal therethrough.

21. The apparatus of claim 19, wherein the at least one conductor is configured to transmit electrical power therethrough.

22. The apparatus of claim 1, further comprising at least three spools, wherein each of the at least three structural side elements are at least partially furled about an associated one of the at least three spools.

23. The apparatus of claim 22, further comprising a frame wherein each of the at least three spools are coupled with the frame and configured to rotate about a defined axis.

24. The apparatus of claim 23, further comprising at least one guide member coupled to the frame and configured to guide the first plurality of interlocking elements of one structural side element of the at least three structural side elements into engagement with the second plurality of interlocking elements of an adjacent structural side element of the at least three structural side elements.

25. The apparatus of claim 24, wherein the at least one guide member is sized, positioned and configured to contact a portion of at least one of the at least three structural side elements and substantially restrain lateral displacement of the portion.

26. The apparatus of claim 23, further comprising a deployment mechanism including at least one drive element configured to motivate each of the at least three structural side elements between a furled state and an at least partially unfurled state.

27. The apparatus of claim 26, further comprising a controller operably coupled with the deployment mechanism.

28. The apparatus of claim 1, further comprising at least one deployable structure configured for substantially simultaneous deployment with at least one of the at least three structural side elements.

29. The apparatus of claim 28, wherein the at least one deployable structure includes a plurality of hinged panels configured to be disposed upon the at least one structural side element upon deployment thereof.

30. An apparatus including a deployable structural assembly comprising:

at least three structural side elements, each of the at least three structural side elements comprising a furlable truss structure, each furlable truss structure comprising:
a first longitudinal member;
a second longitudinal member spaced apart from the first longitudinal member;
a plurality of cross-members, each cross-member of the plurality extending substantially transversely between and coupled with the first longitudinal member and the second longitudinal member;
a plurality of diagonal members, each of the plurality of diagonal members extending between and being coupled with the first longitudinal member and the second longitudinal member and each diagonal member of the plurality extending at an angle relative to an adjacent cross-member of the plurality of cross-members;
a first plurality of interlocking elements formed in the first longitudinal member;
a second plurality of interlocking elements formed in the second longitudinal member;
wherein a portion of at least one interlocking element of the first plurality of interlocking elements of one of the at least three structural side elements is configured to releasably engage within an opening formed in at least one interlocking element of the second plurality of interlocking elements of an adjacent structural side element of the at least three structural side elements; and
at least three spools, wherein each of the at least three structural side elements are at least partially furled about an associated one of the at least three spools; wherein each of the at least three structural side elements is configured to exhibit a first radius of curvature about an axis transverse to a longitudinal axis thereof while in a relaxed state that is greater than a second radius of curvature exhibited by the structural side element about the axis while furled about its associated one of the at least three spools.

31. An apparatus including a deployable structural assembly comprising:
at least three structural side elements, each of the at least three structural side elements formed from at least one sheet of material and comprising a first plurality of interlocking elements extending from a first longitudinal member, and a second plurality of interlocking elements extending from a second longitudinal member, at least one interlocking element of the second plurality of interlocking elements comprising an opening formed therein, wherein the first plurality of interlocking elements of one of the at least three structural side elements is configured for releasable engagement with the second plurality of interlocking elements of an adjacent structural side element of the at least three structural side elements and wherein at least one interlocking element of the first plurality of interlocking elements of one structural side element is configured to be at least partially received within the opening formed in the at least one interlocking element of the second plurality of interlocking elements of an adjacent structural side; and
at least one electronic component integrated with at least one of the at least three structural side elements.

32. The apparatus of claim 31, wherein the at least one electronic component includes at least one sensor.

33. The apparatus of claim 32, wherein the at least one electronic component includes at least one conductor.

34. The apparatus of claim 32, wherein the at least one sensor comprises a plurality of sensors, the plurality of sensors being configured to verify the engagement of the first plurality of interlocking elements with the second plurality of interlocking elements.

35. The apparatus of claim 33, wherein the at least one conductor is configured to transmit at least one of an electrical signal and electrical power therethrough.

36. The apparatus of claim 31, wherein at least one interlocking element of the first plurality of interlocking elements includes an aperture formed therein, wherein at least one interlocking element of the second plurality of interlocking elements includes a tongue formed within the opening, and wherein the tongue of the at least one interlocking element of the second plurality of interlocking elements is configured to be received in the aperture of the at least one interlocking element of the first plurality of interlocking elements.

37. The apparatus of claim 31, further comprising at least three spools, wherein each of the at least three structural side elements are at least partially furled about an associated one of the at least three spools.

38. The apparatus of claim 37, further comprising a frame, wherein each of the at least three spools are coupled with the frame and configured to rotate about a defined axis.

39. The apparatus of claim 38, further comprising at least one guide member coupled to the frame and configured to guide the first plurality of interlocking elements of one of the at least three structural side elements into engagement with the second plurality of interlocking elements of an adjacent structural side element of the at least three structural side elements.

40. The apparatus of claim 39, wherein the at least one guide member is sized, positioned and configured to contact a portion of at least one of the at least three structural side elements and substantially restrain lateral displacement of the portion.

41. The apparatus of claim 37, further comprising a deployment mechanism including at least one drive element configured to motivate each structural side element between a furled state and an at least partially unfurled state.

42. The apparatus of claim 41, further comprising a controller operably coupled with the deployment mechanism.

43. The apparatus of claim 31, further comprising at least one deployable structure configured for substantially simultaneous deployment with at least one of the at least three structural side elements.

44. The apparatus of claim 43, wherein the at least one deployable structure includes a plurality of hinged panels configured to be disposed upon the at least one structural side element upon deployment thereof.

45. An apparatus including a deployable structural assembly comprising:
at least three structural side elements, each of the at least three structural side elements comprising a first plurality of interlocking elements formed in a first longitudinal member, and a second plurality of interlocking elements formed in a second longitudinal member, wherein the first plurality of interlocking elements of one of the at least three structural side elements is configured for releasable engagement with the second plurality of interlocking elements of an adjacent structural side element of the at least three structural side elements and wherein at least one interlocking element of the first plurality of interlocking elements of one structural side element is configured to be at least partially received within an opening formed in at least one interlocking element of the second plurality of interlocking elements of an adjacent structural side;

at least one electronic component integrated with at least one of the at least three structural side elements; and at least three spools, wherein each of the at least three structural side elements are at least partially furled about an associated one of the at least three spools;

wherein each of the at least three structural side elements is configured to exhibit a first radius of curvature about an axis transverse to a longitudinal axis thereof while in a relaxed state that is greater than a second radius of curvature exhibited by the structural side element about the axis while furled about its associated one of the at least three spools.

46. An apparatus including a deployable structural assembly comprising:

at least three furlable structural side elements, each of the at least three structural side elements formed from at least one sheet of material and comprising:

a first plurality of interlocking elements extending from a first edge of each of the at least three furlable structural side elements; and a second plurality of interlocking elements extending from a second edge of each of the at least three furlable structural side elements, at least one interlocking element of the second plurality of interlocking elements comprising an opening formed therein, wherein at least one interlocking element of the first plurality of interlocking elements of one furlable structural side element of the at least three furlable structural side elements is configured to be releasably engaged within the opening formed in the at least one interlocking element of the second plurality of interlocking elements of an adjacent furlable structural side element of the at least three furlable structural side elements; and a deployment mechanism, comprising:

at least three spools, wherein each of the at least three furlable structural side elements are at least partially furled about an associated one of the at least three spools;

a frame wherein each of the at least three spools are coupled to the frame and configured to rotate about a first axis;

at least one roller member coupled to the frame, the at least one roller member configured to rotate about a second axis to guide at least one of the at least three furlable structural side elements during deployment from at least one spool of the at least three spools, wherein the first axis of the at least one spool of the at least three spools is angularly offset from the second axis of the at least one roller member to introduce a twist into at least one furlable structural side element of the at least three furlable structural side elements during deployment.

47. An apparatus including a deployable structural assembly comprising:

at least three structural side elements, each structural side element of the at least three structural side elements being configured for releasable engagement with the an adjacent structural side element; and wherein at least one of the structural side elements exhibits a first radius of curvature about an axis substantially transverse to a longitudinal axis thereof while the at least one structural side element is in a relaxed state, the at least one structural side element being substantially planar while being in a deployed state, and wherein the at least one structural side element exhibits a second radius of curvature less than the first radius of curvature while in a stowed state.

48. The apparatus of claim 47, wherein the first radius of curvature is approximately twice as large as the second radius of curvature.

49. The apparatus of claim 47, further comprising at least three structural reinforcing members, each structural reinforcing member of the at least three structural reinforcing members comprising a plurality of interlocking elements formed therein, wherein the plurality of interlocking elements of each structural reinforcing member of the at least three structural reinforcing members is releasably coupled to a portion of one of the at least three structural side elements and to a portion of an adjacent one of the at least three structural side elements.

* * * * *

UNITED STATES PATENT AND TRADEMARK OFFICE
CERTIFICATE OF CORRECTION

PATENT NO.         : 8,042,305 B2                                    Page 1 of 1
APPLICATION NO.    : 11/080357
DATED              : October 25, 2011
INVENTOR(S)        : Mark K. Pryor and Jeremy O. Newlin It is certified that error appears in the above-identified patent and that said Letters Patent is hereby corrected as shown below:

On the title page:
In ITEM (56) References Cited
U.S. PATENT DOCUMENTS
PAGE 2, 1st COLUMN, LINE 10,   change "Georges" to --Robert--
PAGE 2, 1st COLUMN, LINE 21,   change "Einar et al." to --Medal et al.--

Signed and Sealed this
Twenty-fifth Day of February, 2014

Michelle K. Lee
*Deputy Director of the United States Patent and Trademark Office*